United States Patent [19]
Yasumura et al.

[11] Patent Number: 5,159,462
[45] Date of Patent: Oct. 27, 1992

[54] VIDEO SIGNAL GENERATING APPARATUS

[75] Inventors: Hiroto Yasumura; Masahide Hirasawa; Minoru Noji, all of Kanagawa; Susumu Kozuki, Tokyo; Koji Takahashi, Kanagawa; Katsuji Yoshimura, Kanagawa; Tomohiko Sasatani, Kanagawa, all of Japan

[73] Assignee: Canon Kabushiki Kaisha, Tokyo, Japan

[21] Appl. No.: 609,118

[22] Filed: Oct. 31, 1990

Related U.S. Application Data

[60] Continuation of Ser. No. 393,664, Aug. 11, 1989, abandoned, which is a division of Ser. No. 46,250, May 5, 1987, Pat. No. 4,878,128.

[30] Foreign Application Priority Data

| May 12, 1986 | [JP] | Japan | 61-107985 |
| May 26, 1986 | [JP] | Japan | 61-120883 |
| Jun. 18, 1986 | [JP] | Japan | 61-141813 |
| Jun. 18, 1986 | [JP] | Japan | 61-141814 |
| Jun. 18, 1986 | [JP] | Japan | 61-141815 |
| Jun. 26, 1986 | [JP] | Japan | 61-150207 |
| Apr. 13, 1987 | [JP] | Japan | 62-91458 |
| Apr. 13, 1987 | [JP] | Japan | 62-91459 |

[51] Int. Cl.⁵ ............................................. H04N 9/79
[52] U.S. Cl. ................................. 358/311; 358/906
[58] Field of Search ................ 358/311, 335, 906; 360/14.1, 14.2, 33.1, 35.1

[56] References Cited

U.S. PATENT DOCUMENTS

| 3,747,087 | 7/1973 | Harrison, III et al. | 364/521 |
| 4,261,012 | 4/1981 | Maloomian | 360/14.1 |
| 4,272,790 | 6/1981 | Bates | 360/14.1 |
| 4,521,870 | 6/1985 | Babbel et al. | 360/14.1 |
| 4,685,003 | 8/1987 | Westland | 360/14.1 |
| 4,688,105 | 8/1987 | Bloca et al. | 358/335 |

Primary Examiner—Donald McElheny, Jr.
Attorney, Agent, or Firm—Robin, Blecker, Daley & Driscoll

[57] ABSTRACT

A video signal reproducing apparatus having a video camera part which produces a video signal by picking up an image of an object and is arranged in one unified body at least with a reproducing part which reproduces a video signal from a recording medium is arranged to selectively supply the video signal obtained by picking up the object's image or the reproduced video signal obtained from the recording medium to one and the same signal processing means. The disclosed arrangement not only permits simplification of the apparatus but also enables the apparatus to reproduce a high quality video signal.

19 Claims, 13 Drawing Sheets

VIDEO SIGNAL GENERATING APPARATUS

This application is a continuation of application Ser. No. 393,664, filed Aug. 11, 1989, now abandoned, which is a division of application Ser. No. 046,250, filed May 5, 1987, now U.S. Pat. No. 4,878,128.

BACKGROUND OF THE INVENTION

1. Field of the Invention

This invention relates to a video signal reproducing apparatus for reproducing a video signal.

2. Description of the Related Art

Video tape recorders include a kind having a camera combined in one body therewith (hereinafter referred to as a camera-combined VTR). In cases where the camera-combined VTR is arranged to use a solid-state image sensor for the camera part, a video signal produced from the camera part would deteriorate due to a drop-out if there is some flaw among picture elements arranged on the image sensing plane of the solid-state image sensor. In the event of a video signal obtained from such faulty picture elements, therefore, it has been practiced to lessen the deterioration by means of a picture element defect compensating circuit. The compensating circuit is arranged to replace a faulty video signal portion obtained from the image sensor with a normal video signal portion which is obtained one horizontal scanning period (hereinafter referred to as H period) before and is delayed through a delay circuit.

In reproducing a video signal recorded on a magnetic tape which is employed as a record bearing medium with the VTR, occurrence of a drop-out in a reproduced video signal also deteriorates the reproduced video signal. The reproducing part of the VTR is, therefore, arranged to detect the occurrence of a drop-out in the video signal reproduced by a magnetic head from the magnetic tape. In the event of occurrence of a drop-out in the reproduced video signal, a faulty signal portion thus obtained is replaced by a drop-out compensation circuit with a normal signal portion which has been reproduced one H period before without any drop-out and delayed by a 1-H delay circuit.

Further, the camera part of the conventional camera-combined type VTR has been arranged to convert the optical image of an object picked up into a video signal; to display the image of the object at an electric view finder (hereinafter referred to as EVF) or on an external monitor by supplying the video signal to the EVF or the monitor via an external output terminal; and to record the video signal on a magnetic tape by means of a rotary magnetic head or the like by supplying the video signal to the recording part of the VTR. Meanwhile the reproducing part of the VTR has been arranged to process a reproduced video signal including a drop-out compensating process, an edge emphasizing process, a noise removing process, etc.; and then to have an image displayed on the basis of the reproduced processed video signal by supplying it to an external monitor TV set or the like from an external output terminal.

In recording, on a magnetic tape, a color video signal obtained by means of a camera, if the white balance is not adequately obtained, the color of a reproduced picture tends to become unnatural when the color video signal is reproduced from the magnetic tape. In view of this, the conventional camera-combined type VTR has been arranged to include a white balance obtaining circuit in a video signal processing circuit of the camera part thereof.

Further, in recording, R, G and B signals which are obtained at the camera part of the camera-combined type VTR are supplied to a matrix circuit to obtain a luminance signal Y and color difference signals R-Y and B-Y. A character luminance signal which is generated by a character generator is added to the luminance signal Y. The luminance signal then undergoes a signal processing operation including pre-emphasis process, etc. before it is frequency modulated. Meanwhile, the color difference signals R-Y and B-Y are quadrature two-phase modulated into carrier chrominance signal. Then, a character carrier chrominance signal which is generated also by the character generator is added to the carrier chrominance signal among other processes performed on the chrominance signal. After these processes, the chrominance signal is low band converted into a low-band carrier chrominance signal. The frequency modulated luminance signal and the low-band converted carrier chrominance signal are frequency multiplexed and made into a recording signal to be recorded on the tape by means of the rotary head.

During reproduction, a reproduced signal is supplied to the low-pass filter and a bandpass filter to separate the frequency modulated chrominance signal and the low-band converted carrier chrominance signal. The frequency modulated luminance signal is demodulated into the original luminance signal. The low-band converted carrier chrominance signal is frequency converted into the original carrier chrominance signal. Then, the luminance signal and the carrier chrominance signal are multiplexed and produced as a television signal.

Further, the camera part of the conventional camera-combined type VTR includes a high luminance suppression circuit which is arranged to prevent a false color signal from appearing in the event of a high degree of luminance by suppressing a luminance signal to have no chrominance signal mixed therein. Further, during reproduction, a drop-out, a noise, etc. would affect a color burst signal included in the reproduced video signal and would cause it to be reproduced either as a drop-out signal or as a false signal. In that event, a reproduced picture based on a video signal having such a color burst signal becomes hardly presentable. To solve this problem, therefore, the reproduction system of the VTR includes a so-called color killer circuit which is arranged to cut a reproduced chrominance signal as necessary according to the level of the reproduced color burst signal. Meanwhile, a higher degree of resolution is obtainable in a black-and-white mode (hereinafter referred to as B/W mode) which gives a broader band of the luminance signal. Therefore, picture recording is sometimes performed intentionally in the B/W mode. In view of this, the reproduction system of the conventional VTR is sometimes provided with a circuit which is arranged to discriminate a picture recorded on a magnetic tape as to whether it is recorded in the B/W mode or in a color mode; and, in the event of the former, to cut the chrominance signal, because: In the case of the B/W mode, a signal component of a chrominance signal band is either meaningless or rather detrimental and therefore should be prevented from mixing in the luminance signal.

The conventional camera-combined type VTR is arranged to emphatically record the edge parts of the recording video signal by applying a luminance signal produced from the image pick-up and recording camera part to a luminance signal edge emphasizing circuit; and, for a reproduced signal obtained from the VTR part thereof, to emphasize the edge parts of a reproduced luminance signal separated from the reproduced signal by means of another luminance signal edge emphasizing circuit in the stage of adding up the reproduced luminance signal and a reproduced carrier chrominance signal. In other words, the conventional camera-combined type VTR has been provided with an edge emphasizing circuit for the recording signal and another edge emphasizing circuit for the reproduced signal. Further, the conventional camera-combined type VTR is provided with a fader device which is arranged within the camera part. However, no fader device is provided for the reproduction system of the VTR. Therefore, in a case where a fading process is to be applied to a reproduced video signal, some video editing device or the like that is capable of functioning as a fader must be connected to the video output terminal Vout. The conventional camera-combined type VTR has been thus arranged to be capable of forming a video signal by using a fader before transmitting it to the VTR part during recording. In reproducing a recorded video signal, the above stated video editing device has been used when a fading process is to be applied to the reproduced signal.

However, the camera-combined type VTR is required to be small in size and light in weight in general. Whereas, the above stated picture element defect correction circuit and the drop-out correction circuit of the camera-combined type VTR are discretely provided with separate 1-H delay circuits although these correction circuits are never simultaneously used. This arrangement not only hinders reduction in size and weight of the VTR but also results in an increase in cost.

The conventional camera-combined type VTR is arranged to record on a magnetic tape, without any noise removing process, a video signal formed on the basis of an optical image of an object obtained from the camera part; and to perform a noise removing process during a reproducing operation. According to this method, however, the noise component generated at the camera part during a recording operation cannot be removed and thus has a deteriorated reproduced picture displayed on an external monitor TV set although a noise component generated at the time of reproduction from the magnetic tape can be removed.

Further, since no noise removing process is performed in recording at the camera part of the camera-combined type VTR, the picture displayed on the above stated EVF or the external monitor TV set has not been always adequately obtained. This problem may be solved by providing the camera part of the VTR with a noise removing circuit or the like in addition to the circuit provided within the reproducing part. However, for the camera-combined type VTR which is strongly desired to be compact in size and light in weight, the arrangement to provide the camera part with additional noise removing circuitry which is never used concurrently with the noise removing circuit of the reproducing part not only hinders reduction in size and weight but also results in an increase in cost.

In recording a color video signal on a magnetic tape, it is absolutely necessary to make white balance adjustment. Meanwhile, the white balance of the monitor TV set also has a considerable degree of influence over the reproduced picture. It is therefore preferable to include a white balance adjusting process in reproducing the video signal from the magnetic tape. The conventional camera-combined type VTR has been arranged without including any white balance circuit in the reproducing circuit system thereof on the assumption that the white balance is adequately adjusted during a recording operation and that the monitor TV also has adequate white balance.

It is, however, not desirable to have an additional white balance circuit solely for the reproduction part because it increases the number of circuit elements and the manufacturing cost of the camera-combined type VTR which is strongly desired to be compact and not heavy.

In case that the camera-combined type VTR is to be arranged to add to the picture some character or characters indicating a title, a date, etc., a character video signal has been added by means of a character generator included in the camera part to the color video signal obtained by the camera part by sensing an object's image. The addition of the character video signal has been possible only during a recording operation. In cases where characters must be added during a reproducing operation, the VTR necessitated use of some discrete editing device or the like having a character adding function. Such a device makes the VTR system complex and expensive. This has presented a problem.

Another shortcoming of the conventional camera combined type VTR resides in that: In correcting the chrominance signal during a reproducing operation, the chrominance signal must be corrected in the state of the carrier chrominance signal. However, since the carrier chrominance signal includes hue information by its phase, it is difficult to correct it while retaining the continuity of the phase variations thereof. Any phase relation disturbing correction, such as compensation for a signal drop-out or noise removal by means of a feedback type noise removing circuit, has been impossible. This difficulty has inevitably resulted in some deterioration, such as color shading, of a reproduced chrominance signal.

The high luminance suppressing circuit and the color killer circuit restrain the addition of the chrominance signal to the luminance signal. The conventional camera-combined type VTR is provided with both of these circuits. The high luminance suppressing circuit is arranged to be used for an image sensing operation while the color killer circuit is used for reproduction. However, the use of both of these circuits performing similar functions is wasteful and meaningless for the camera-combined type VTR which is strongly desired to be small in size and light in weight.

Further, the conventional camera-combined type VTR is provided, as mentioned in the foregoing, with the edge emphasizing circuit for the recording signal and another edge emphasizing circuit for the reproduced signal. Meanwhile, the arrangement to provide the camera-combined type VTR which is strongly desired to be compact and light with both the emphasizing circuits which perform the same function for recording and reproduction and not to be simultaneously used is likewise meaningless.

It is the most important advantage for a camera combined type VTR to be easily portable and to be capable of permitting confirmation of a recording state at the very place of recording immediately after recording. Therefore, it is a disadvantage and not desirable for the VTR of this type to necessitate the use of a discrete video editing device having a fading function even if the device is small in size.

In view of this, it is conceivable to solve the above stated problem by including a fader device in the reproduction system of the VTR of this type in addition to the fader device provided within the camera part thereof. In that event, however, the circuit arrangement of the VTR becomes complex causing an increase in the manufacturing cost. That presents another problem.

SUMMARY OF THE INVENTION

It is a general object of this invention to solve the problems of the prior art described above.

It is a more specific object of this invention to provide a video signal reproducing apparatus which permits simplification of the circuit arrangement thereof for reduction in the cost of manufacture while retaining all the functions required.

Under this object, a video signal reproducing apparatus arranged as an embodiment of this invention to produce a video signal comprises: image sensing means arranged to pick up an image of an object and to generate a first video signal according to information on the image of the object; reproducing means for reproducing a second video signal from a recording medium; compensating means for compensating for drop-out in the first or second video signal; and supply means for selectively supplying the first or second video signal to the compensating means.

It is another object of this invention to provide a video signal reproducing apparatus which is capable of reproducing a video signal with a high quality despite being of a simplified arrangement made possible by combined use of some component thereof for different purposes.

Under that object, a video signal reproducing apparatus arranged as another embodiment of this invention to produce a video signal comprises: image sensing means arranged to pick up an image of an object and to generate a first video signal according to information on the image of the object; reproducing means for reproducing a second video signal from a recording medium; noise removing means for removing the noise components of the first or second video signal; and supply means for selectively supplying the first or second video signal to the noise removing means.

It is a further object of this invention to provide a video signal reproducing apparatus which permits reduction in size and weight of the apparatus by combined use of some component thereof for different purposes.

Under the above stated object, a color video signal reproducing apparatus arranged as an embodiment of this invention to produce a color video signal comprises: image sensing means arranged to pick up an image of an object and to generate a first color video signal according to information on the image of the object; reproducing means for reproducing a second color video signal from a recording medium; suppression means for selectively suppressing the color information component of the first or second color video signal; and supply means for selectively supplying the first or second color video signal to the suppression means.

It is a further object of this invention to provide a video signal reproducing apparatus which is capable of performing many functions despite being of simplified arrangement thereof by arranging the function of a given part of the apparatus to be performable also for some other part of the apparatus.

Under this object, a video signal reproducing apparatus arranged as an embodiment of this invention to produce a video signal comprises: image sensing means arranged to pick up an image of an object and to generate a first video signal according to information on the image of the object; reproducing means for reproducing a second video signal from a recording medium; video signal adding means for adding a third video signal to the first or second video signal; and supply means for selectively supplying the first or second video signal to the video signal adding means.

It is a further object of this invention to provide a video signal reproducing apparatus which permits reduction in size and weight thereof without lowering the quality of the output thereof by combined use of some of its component parts for different purposes.

Under that object, a video signal reproducing apparatus arranged as an embodiment of this invention to produce a video signal comprises: image sensing means arranged to pick up an image of an object and to generate a first video signal which corresponds to information on the image of the object and contains a first color difference signal therein; reproducing means arranged to reproduce a second video signal from a recording medium; color difference signal forming means for forming a second color difference signal from the second video signal obtained by the reproducing means; converting means for converting the first or second color difference signal into a carrier chrominance signal; supply means for selectively supplying the first color difference signal or the second color difference signal to the converting means.

It is a still further object of this invention to provide a video signal reproducing apparatus which is capable of giving a reproduced video signal in a high quality and permits reduction in size, weight and cost thereof by arranging a signal processing operation of the video camera part thereof to be performable also for the reproducing part thereof.

Under the above stated object, a video signal reproducing apparatus arranged as an embodiment of this invention to have a video camera part which picks up an image of an object and produces a video signal for the image and is arranged in one unified body at least with a reproducing part which reproduces a video signal from a recording medium, the apparatus comprising: image sensing means arranged to pick up an image of an object and to generate a first video signal corresponding to the object's image; reproducing means for reproducing a second video signal from a recording medium; signal processing means for performing a signal processing operation on the first or second video signal; and supply means for selectively supplying the first video signal or the second video signal to the signal processing means.

The above and other objects and features of this invention will become apparent from the following detailed description of embodiments thereof taken in connection with the accompanying drawings.

DETAILED DESCRIPTION OF PREFERRED EMBODIMENTS

Figure 1:
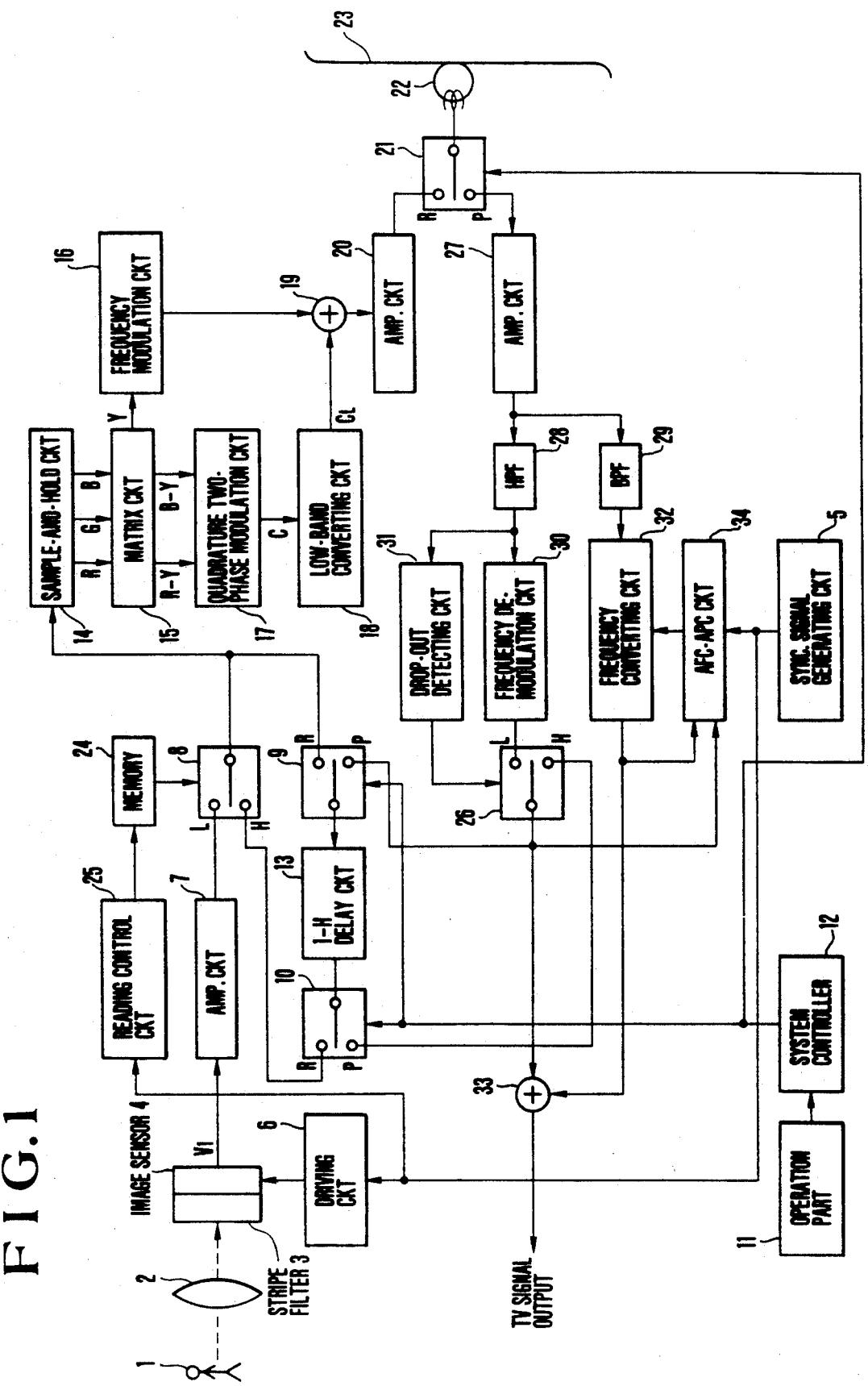
FIG. 1 is a block diagram showing in outline the arrangement of a camera-combined type VTR having a picture-element-defect and drop-out compensating circuit arranged according to this invention as a first embodiment thereof.

This invention will become more apparent from the following detailed description of embodiments thereof:

FIG. 1 shows in outline a camera-combined type VTR arranged as a first embodiment of this invention. In recording, an optical image of an object 1 is formed on the image sensing plane of an image sensor 4 through an image pick-up lens 2 and a color stripe filter 3. A driving circuit 6 produces driving pulses to drive the image sensor 4 on the basis of a synchronizing signal generated from a synchronizing signal generating circuit 5. In response to this, the image sensor 4 produces a video signal V1 representing the optical images of the object 1 formed on the image sensing plane of the sensor 4.

Figure 2:
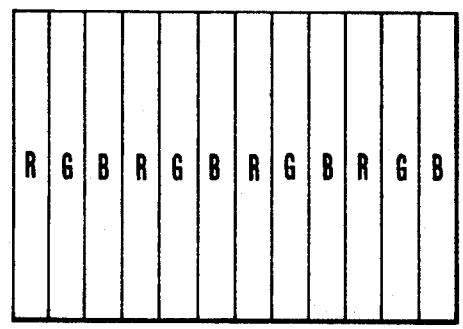
FIG. 2 shows by way of example the arrangement of a color stripe filter included in FIG. 1.

The color stripe filter 3 is arranged as shown in FIG. 2. Therefore, the video signal V1 produced from the image sensor 4 consists of three primary color signals R (red), G (green) and B (blue) which are time serially aligned. The video signal V1 produced from the image sensor 4 is supplied to an amplifier circuit 7 to be amplified there. The amplified video signal is supplied to one side L of a change-over switch 8. Further, in recording, an instruction for recording is given via an operation part 11. In response to this, a recording mode signal is produced from a system controller 12. Then, the connecting position of each of change-over switches 9, 10 and 21 is shifted to one side R thereof. The output terminal of the change-over switch 8 is then connected via a 1-H delay circuit 13 to the other side H of the switch 8 as shown in FIG. 1. The connecting position of change-over switch 8 is normally on the side L. The video signal V1 which is amplified by the amplifier circuit 7 is thus supplied via the change-over switch 8 to a sample-and-hold circuit 14. Since the video signal V1 consists of a time serial alignment of the signals R, G and B as mentioned in the foregoing, the sample-and-hold circuit 14 forms parallel signals R, G and B by performing a sample-and-holding operation at different timings on the video signal V1. The parallel signals R, G and B are then supplied to a matrix circuit 15. The matrix circuit 15 then for a luminance signal Y and for difference signals R-Y and B-Y from the signals R, G and B in a known manner. The luminance signal Y is frequency modulated into a high frequency band by a frequency modulation circuit 16. The color difference signals R-Y and B-Y are converted into a carrier chrominance signal C by a quadrature two-phase modulation circuit 17. The signal C is then further frequency converted into a low-band carrier chrominance signal CL by a low-band frequency converting circuit 18.

The frequency modulated luminance signal Y and the low-band carrier chrominance signal CL are frequency multiplexed together at a frequency multiplexing circuit 19. The multiplex signal thus obtained is amplified at an amplifier circuit 20. The output of the circuit 20 is then supplied to a magnetic head 22 via a change-over switch 21 the connecting position of which is on one side R thereof to permit the output to be recorded on a magnetic tape 23.

The switching operation of the change-over switch 8 is arranged to be performed under the control of switch control data read out from a memory 24 by a reading control circuit 25. The details of this are as described below:

The memory 24 has memory areas corresponding to the picture elements of the image sensor 4. Each of the memory areas stores either a low (L) level switch control data which shifts the position of the change-over switch 8 to the side L (see FIG. 1) or a high (H) level switch control data which shifts the switch 8 to another side H thereof. In other words, among the plurality of picture elements of the image sensor 4 employed in the apparatus, a faulty element having a flaw or the like gives an abnormal video signal portion. Deterioration of the video signal due to such a faulty element must be made inconspicuous by replacing the abnormal portion of the video signal with a normal video signal portion obtained from a flawless picture element. The picture elements of the image sensor 4 are examined beforehand for the presence of such faulty elements. The high level switch control data is stored in the memory areas of the memory 24 corresponding to the faulty picture elements while the low level switch control data is stored in the memory areas corresponding to the flawless picture elements.

The same synchronizing signal as the above stated synchronizing signal supplied from the synchronizing signal generating circuit 5 to the driving circuit 6 for driving the image sensor 4 is also supplied to the reading control circuit 25 which is arranged to read out the switch control data from the memory 24. In synchronism with the video signal portion produced from each of the picture elements of the image sensor 4, the reading control circuit 25 supplies the change-over switch 8 with the switch control data from the memory 24. The switching operation of the change-over switch 8 is thus controlled by the switch control data. When the switch control data is at a low level, the portion of the video signal is then coming from the image sensor 4 via the amplifier circuit 7 is considered to have been obtained from a normal or flawless picture element and is allowed to be supplied as it is to the sample-and-hold circuit 14 via the side L of the change-over switch 8. At the same time, the video signal portion is also supplied to a 1-H delay circuit 13 via the change-over switch 9. In case that the switch control data supplied from the memory 24 is at a high level, the portion of the video signal V1 coming at that time from the image senser 4 via the amplifier circuit 7 is considered to have been obtained from a faulty picture element. In that event, the connecting position of the change-over switch 8 is shifted to the side H thereof. Then, the normal portion of video signal V1 which has been obtained one H period (horizontal scanning period) before and delayed by the 1-H delay circuit 13 is supplied to the side H of the change-over switch 8 via the change-over switch 10. The delayed normal portion of the video signal V1 is thus supplied to the sample-and-hold circuit 14 to be recorded on the magnetic tape 23 in the above stated manner in place of the portion obtained from the faulty picture element.

As described above, the deterioration of the video signal due to a faulty or defective picture element can be made inconspicuous before recording even in the event of an image sensor having faulty picture elements by replacing the defective portion of the video signal with a portion of the video signal which is obtained from a normal picture element through the 1-H delay circuit.

The reproducing operation of the first embodiment of this invention which is arranged as shown in FIG. 1 is as follows: Referring to FIG. 1, when a reproduction mode signal is produced from the system controller 12 in response to a reproducing instruction given through the operation part 11, the connecting position of each of the change-over switches 9, 10 and 21 is shifted to one side P thereof. Then, the output terminal of a change-over switch 26 is connected to one side H of the same switch 26 via the 1-H delay circuit 13.

During reproduction, the magnetic head 22 traces recording tracks on the magnetic tape 23 under the control of a tracking control circuit which is not shown. A signal reproduced by the magnetic head 22 is supplied to an amplifier circuit 27 via a change-over switch 21 which is in a connecting position on one side P thereof as shown in FIG. 1. The reproduced signal is amplified by the circuit 27. The amplified reproduced signal is supplied to a high-pass filter (hereinafter referred to as HPF) 28 to separate therefrom the luminance signal Y which has been frequency modulated to be in a high frequency band. The amplified signal is also supplied to a band-pass filter (hereinafter referred to as BPF) 29 to separate therefrom the low-band carrier chrominance signal CL which has been frequency converted to a low frequency band. The frequency modulated luminance signal Y is then supplied to a frequency demodulation circuit 30 and a drop-out detecting circuit 31. The low-band carrier chrominance signal CL is supplied to a frequency converting circuit 32.

The drop-out detecting circuit 31 is arranged to normally supply a low level detection signal to the change-over switch 26 and to monitor the frequency modulated luminance signal Y for detecting any drop-out in a known manner. The detecting circuit 31 supplies the change-over switch 26 with a high level detection signal when a drop-out is detected.

The switching operation of the change-over switch 26 is under the control of the detection signal supplied from the drop-out detecting circuit 31. The connecting position of the switch 26 is on one side L thereof when the detection signal is at a low level and is on another side H when the detection signal is at a high level.

With no drop-out detected in the frequency modulated luminance signal Y which is separated by the HPF 28, the change-over switch 26 is allowed to be on the side L by the drop-out detecting circuit 31. In that case, therefore, the luminance signal Y is demodulated by a frequency demodulation circuit 30 and is then supplied to a frequency multiplexing circuit 33 and also to the 1-H delay circuit 13 via the change-over switch 9. In the event of detection of a drop-out in the frequency modulated luminance signal Y separated by the HPF 28, the connecting position of the change-over switch 26 is shifted to the other side H by the drop-out detecting circuit 31. In that event, therefore, a normal portion of the luminance signal Y which has been obtained one H period before and delayed by the 1-H delay circuit 13 is supplied via the change-over switch 10 to the side H of the change-over switch 26. The switch 26 thus allows the delayed portion of the luminance signal Y to be supplied to the frequency multiplexing circuit 33 in place of the drop-out portion of the luminance signal Y.

Meanwhile, the low-band carrier chrominance signal CL which is supplied to the frequency converting circuit 32 is frequency converted into a carrier chrominance signal C by means of a reference signal which is formed by a known AFC-APC circuit 34 and contains a jitter component therein. At the same time, a jitter component which is generated during the process of reproduction is removed from the carrier chrominance signal C. After removal of the jitter component, the carrier chrominance signal C is supplied to the frequency multiplexing circuit 33. Then, the signal C is frequency multiplexed by the circuit 33 together with the above stated drop-out compensated luminance signal Y. The signals C and Y are thus restored to the form of a television signal, which is produced from the apparatus.

It is a feature of the embodiment described that one and the same 1-H delay circuit is arranged not only to compensate for the defective portion due to a fault of the image sensor in recording with the camera part and also to make drop-out compensation for the VTR part but the apparatus during a reproducing operation. The use of one and the same 1-H delay circuit both for recording and for reproduction through a change-over arrangement advantageously permits reduction in cost, size and weight of the apparatus.

While this embodiment is arranged to use the color stripe filter which is arranged as shown in FIG. 2, the filter may be replaced with some different filter. Any filter is usable according to the invention as long as the VTR includes at least one 1-H delay circuit which is capable of compensating for a fault of the image sensor.

Figure 3:
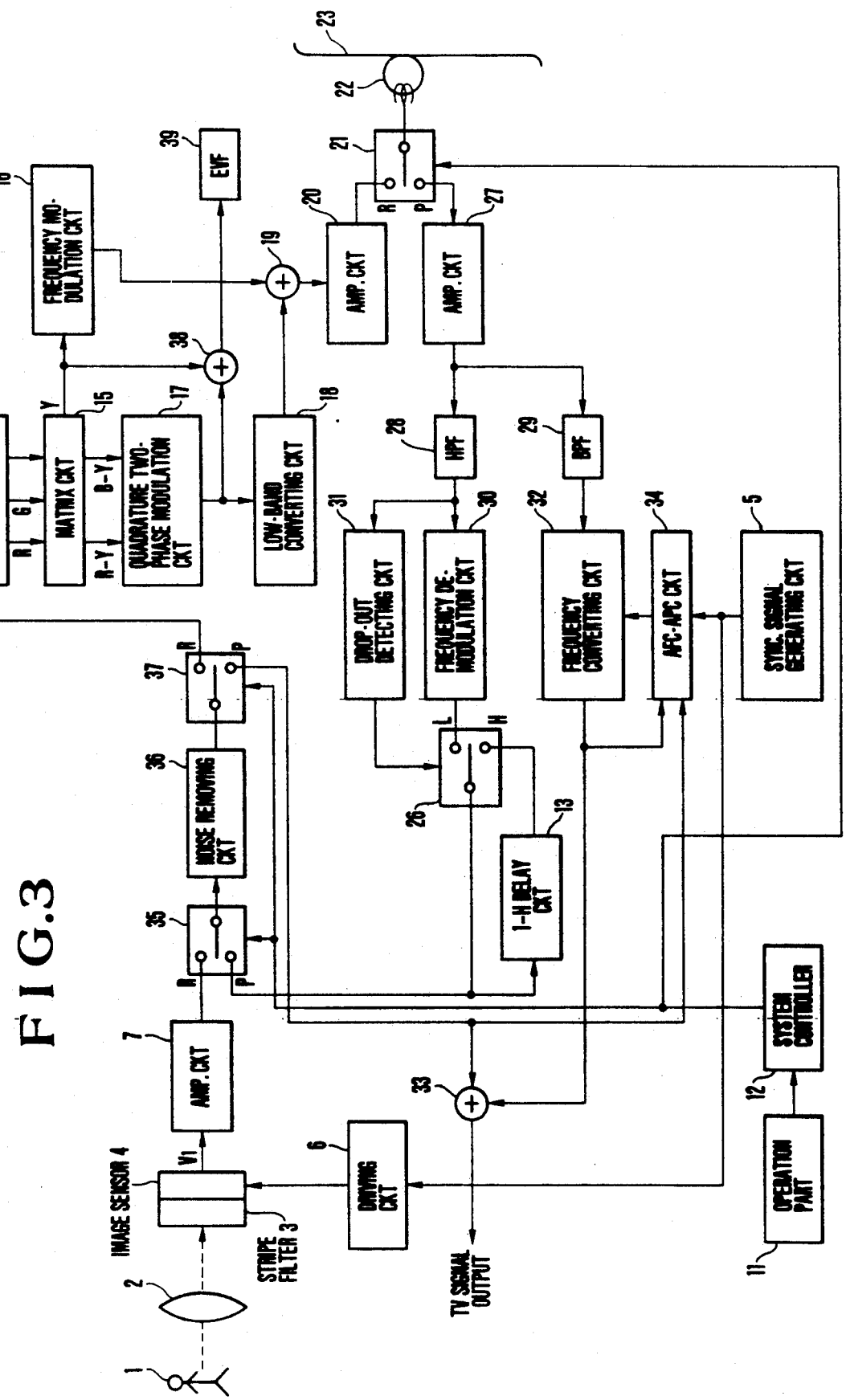
FIG. 3 is a block diagram showing in outline the arrangement of a camera-combined type VTR having a noise removing circuit arranged according to this invention as a second embodiment thereof.

FIG. 3 shows in outline the arrangement of a camera-combined type VTR arranged as a second embodiment of this invention. In FIG. 3, the same components as those shown in FIG. 1 are indicated by the same reference numerals and the details of them are omitted from the following description. First, the recording operation of the second embodiment is as follows:

Referring to FIG. 3, a video signal V1 which is produced from the image sensor 4 is amplified by the amplifier circuit 7 in the same manner as in the case of FIG. 1. The amplified video signal V1 is supplied to one connecting side R of a change-over switch 35. In recording, an instruction for a recording operation is given at the operation part 11. In response to this, the system controller 12 produces a recording mode signal. The connecting position of each of change-over switches 21, 35 and is shifted to one side R thereof. The output of the change-over switch 35 then becomes suppliable to a noise removing circuit 36.

Figure 4:
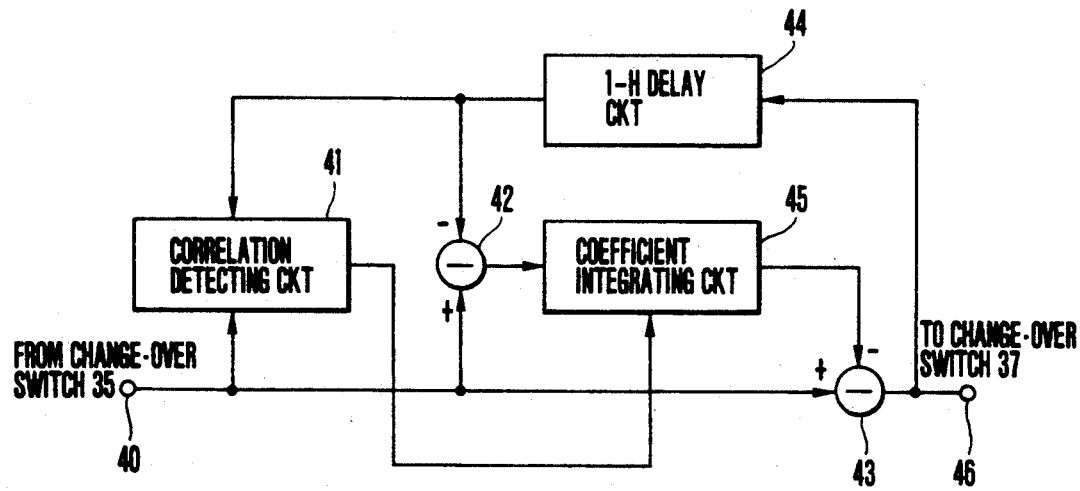
FIG. 4 is a diagram showing an example of arrangement of the noise removing circuit shown in FIG. 3.

The noise removing circuit 36 is, for example, arranged as shown in FIG. 4. Referring to FIG. 4, a video signal V1 comes via the change-over switch 35 to the input terminal 40 and is supplied to a correlation detecting circuit 41 and subtraction circuits 42 and 43.

At the correlation detecting circuit 41, a correlation determining computation is performed to find correlativity between a video signal portion which has been obtained after noise removal one H (horizontal scanning) period before and delayed as much as one H period by a 1-H delay circuit 44 and the currently incoming portion of the video signal V1. Then, in accordance with the result of this computing operation, a setting value of a coefficient to be used at a coefficient integrating circuit 45 is controlled. More specifically, the coefficient integrating circuit 45 is arranged to have a coefficient $\alpha$ within a range of $0 \leq \alpha \leq 1$ and to have it, for example, set at a value closer to 1 according as the correlation is stronger and closer to 0 according as the correlation is weaker.

The correlation between the present portion and the 1-H preceding portion of the video signal V1 is thus determined and the coefficient $\alpha$ is set accordingly. Following this, the subtraction circuit 42 performs a subtracting operation on the precedent portion of the video signal V1 delayed by the 1-H delay circuit 44 and the present portion of the video signal V1. A difference signal which is thus obtained is supplied to the above stated coefficient integrating circuit 45. The circuit 45 integrates it with the coefficient $\alpha$ set in the above stated manner. The result of integration is supplied to the other subtraction circuit 43.

As mention in the foregoing, the present portion of the video signal V1 is supplied via the change-over switch 35 to the subtraction circuit 43. This circuit 43 subtracts the output of the coefficient integrating circuit 45 from the present portion of the video signal V1.

In other words, the arrangement of the noise removing circuit 36 is as follows: The difference signal which is produced from the subtraction circuit 42 can be considered to be consisting almost entirely of a noise component in the event of a strong correlation between the present and 1-H preceding portions of the video signal V1. In that event, therefore, the coefficient $\alpha$ is set at a value close to 1 to have the difference signal of the subtraction circuit 42 subtracted almost completely as it is from the present portion of the video signal V1. In case of a weak correlation between the present and 1-H preceding portions of the video signal V1, the difference signal from the subtraction circuit 42 can be considered to include not much noise component. In this case, therefore, the coefficient $\alpha$ is set at a value close to 0 and the video signal V1 is allowed to be produced without much subtraction of the difference signal made at the subtraction circuit 42 from the present portion of the video signal V1. With the noise component thus having been appositely removed therefrom, the video signal V1 is supplied to a 1-H delay circuit 44 and an output terminal 46. The 1-H delay circuit 44 delays the signal as much as one H period and a noise removing process is carried out, in the same manner as mentioned above, for the above stated correlativity detection.

The video signal V1 from which the noise component has been removed as mentioned above is supplied from the output terminal 46 to a change-over switch 37 which is in its connection position on one side R thereof. The switch 37 then allows the video signal to be supplied to a sample-and-hold circuit 14.

The noise-removed video signal from the noise removing circuit 36 is supplied to the sample-and-hold circuit 14 and the matrix circuit 15 to obtain a luminance signal Y and color-difference signals R-Y and B-Y in the same manner as in the case of FIG. 1. The luminance signal Y is supplied to the frequency modulation circuit 16 and the frequency multiplexing circuit 38. The color difference signals R-Y and B-Y are supplied to the quadrature two-phase modulation circuit 17.

At the quadrature two-phase modulation circuit 17, the color difference signals R-Y and B-Y are converted into a carrier chrominance signal C through a quadrature two-phase modulation process. The signal C is supplied to the above stated frequency multiplexing circuit 38 and also to the low-band converting circuit 18.

At the frequency multiplexing circuit 38, the luminance signal Y and the carrier chrominance signal C are frequency multiplexed into the form of a television signal. The television signal is supplied to an EVF 39. Upon receipt of the television signal, the EVF 39 makes a display on the basis of the signal. The arrangement to supply the television signal from the frequency multiplexing circuit 38 to the EVF 39 may be changed to supply it to an external monitor TV set or to another VTR.

Meanwhile, the luminance signal Y is frequency modulated into a high frequency band at the frequency modulation circuit 16. The carrier chrominance signal C is frequency converted into a low frequency band at the low-band converting circuit 18. The two signals are frequency multiplexed by the frequency multiplexing circuit 19. After that, the output of the circuit 19 is recorded on a magnetic tape 23 like in the case of FIG. 1.

The embodiment is capable of recording the video signal in a good state by removing noises from the signal through the above stated noise removing operation of the noise removing circuit. The embodiment also permits the image of an object to be displayed by an EVF or by some external monitor TV set or the like in a good state.

The second embodiment which is arranged as shown in FIG. 3 performs a reproducing operation in the following manner: When an instruction for a reproducing operation is given at the operation part 11, the system controller 12 produces a reproducing mode signal. This mode signal shifts the positions of change-over switches 21, 35 and 37 to their connecting sides P respectively. Then, the output terminal of the change-over switch 26 is connected via the noise removing circuit 36 to a frequency multiplexing circuit 33. Then, like in the first embodiment, the signal reproduced from the magnetic tape 23 is divided into a luminance signal Y which is in a state of having been frequency modulate and a low-band carrier chrominance signal CL. The low-band carrier chrominance signal CL is converted into a carrier chrominance signal C by a frequency converting circuit 32 in the same manner as in the first embodiment shown in FIG. 1 and is supplied to the frequency multiplexing circuit 33. Meanwhile, the frequency modulated luminance signal Y is supplied to a frequency demodulation circuit 30 and a drop-out detecting circuit 31.

The drop-out detecting circuit 31 is arranged to supply a detection signal to the change-over switch 26 normally at a low level and to detect a drop-out in a known manner by monitoring the frequency modulated luminance signal Y. In the event of detection of a drop-out, the circuit 31 supplies the detection signal at a high level to the change-over switch 26. The change-over switch 26 is thus arranged to operate under the control of the detection signal from the drop-out detecting circuit 31. The position of the switch 26 is on one connecting side L when the detection signal from the circuit 31 is at a low level and is on another connecting side H when the detection signal is at a high level. In other words, the drop-out detecting circuit 31 brings the connecting position of the change-over switch 26 to the side L when the frequency modulated luminance signal Y has no drop-out. In this case, the signal Y is demodulated by the frequency demodulation circuit 30 and is supplied as it is to the noise removing circuit 36 via the change-over switch 26 and is also supplied to the 1-H delay circuit 13. In case that the frequency modulated luminance signal Y which is separated by the HPF 28 has a drop-out therein, the drop-out detecting circuit 31 shifts the position of the change-over switch 26 to its connecting side H. In that case, a normal portion of the luminance signal Y which has been reproduced one H period before and delayed by the 1-H delay circuit 13 is supplied via the change-over switch 35 to the noise removing circuit 26 in place of the present portion of the luminance signal Y.

Upon receipt of the reproduced luminance signal Y which has been thus drop-out compensated, the noise removing circuit 36 perform a noise removing process on the signal in the same manner as the process performed on the video signal V1 obtained from the image sensor 4 in the recording mode. After completion of the noise removing process, the reproduced luminance signal is supplied with change-over switch 37 of the frequency multiplexing circuit 33.

At the frequency multiplexing circuit 33, the luminance signal Y which has been drop-out compensated and noise removed is frequency multiplexed with the carrier chrominance signal C which comes from the frequency converting circuit 32. These signals are restored into the form of a TV signal and produced in that form.

The embodiment is thus arranged to be capable of reproducing a video signal from a magnetic tape in an adequate state by virtue of the noise removing process performed by the noise removing circuit as mentioned above.

In the embodiment described, the same noise removing circuit that serves to remove a noise component from a video signal obtained from the image sensor during a recording operation performed with the camera part is used also for removing a noise component from a video signal reproduced during a reproducing operation which is performed by the VTR part of the embodiment. With the use of one and the same noise removing circuit switched over between recording and reproducing operations, the embodiment permits reduction in cost, size and weight of the apparatus. While the second embodiment uses the color stripe filter which is arranged as shown in FIG. 2, this invention is not limited to the use of such. The embodiment may be arranged to use some other filter that is differently arranged. In that event, the noise removing circuit for the video signal may be also suitably changed from the arrangement shown in FIG. 4.

Figure 5:
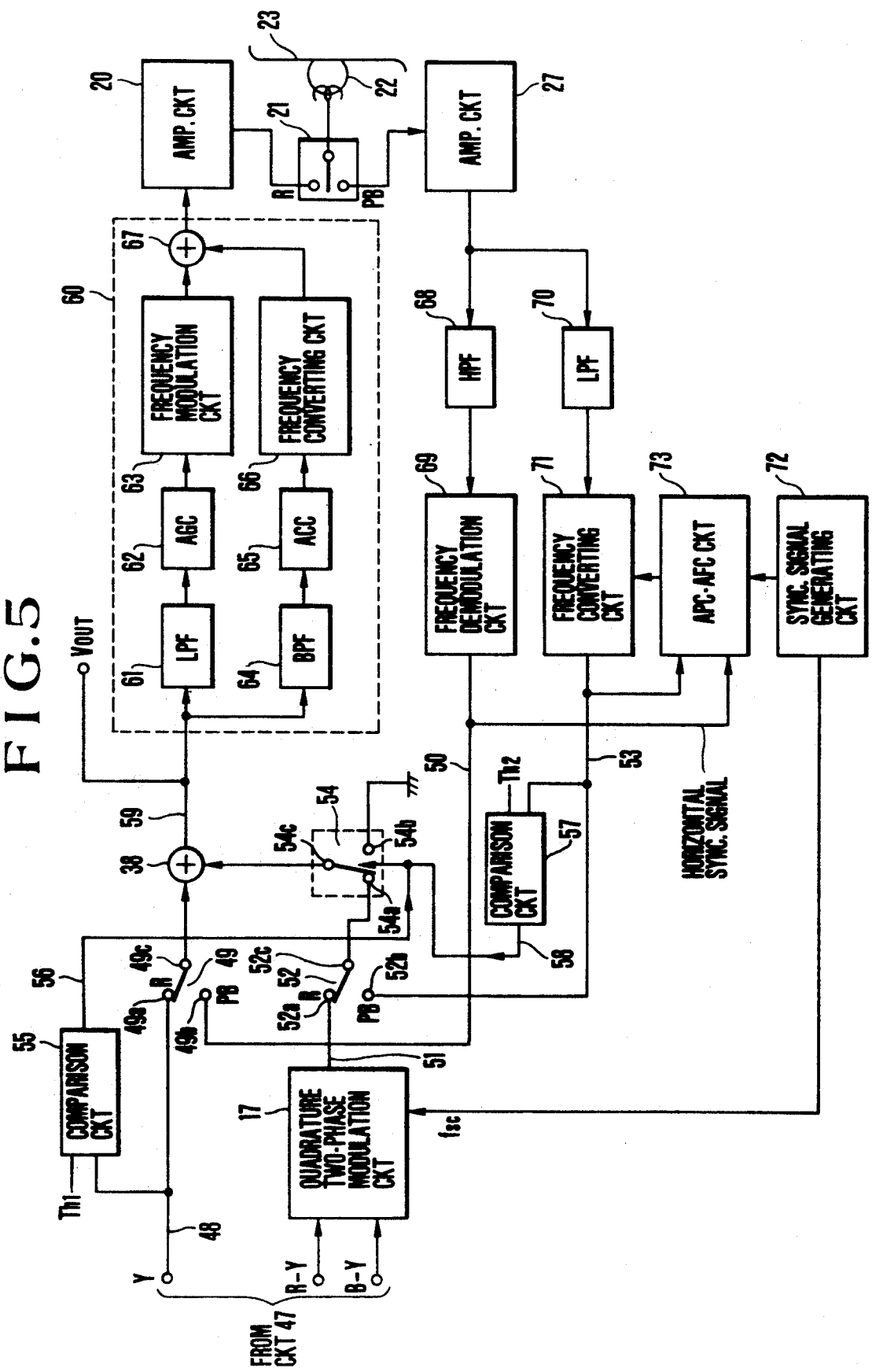
FIG. 5 is a block diagram showing in outline the arrangement of a camera-combined type VTR having a color killer circuit arranged according to this invention as a third embodiment thereof.
Figure 6:
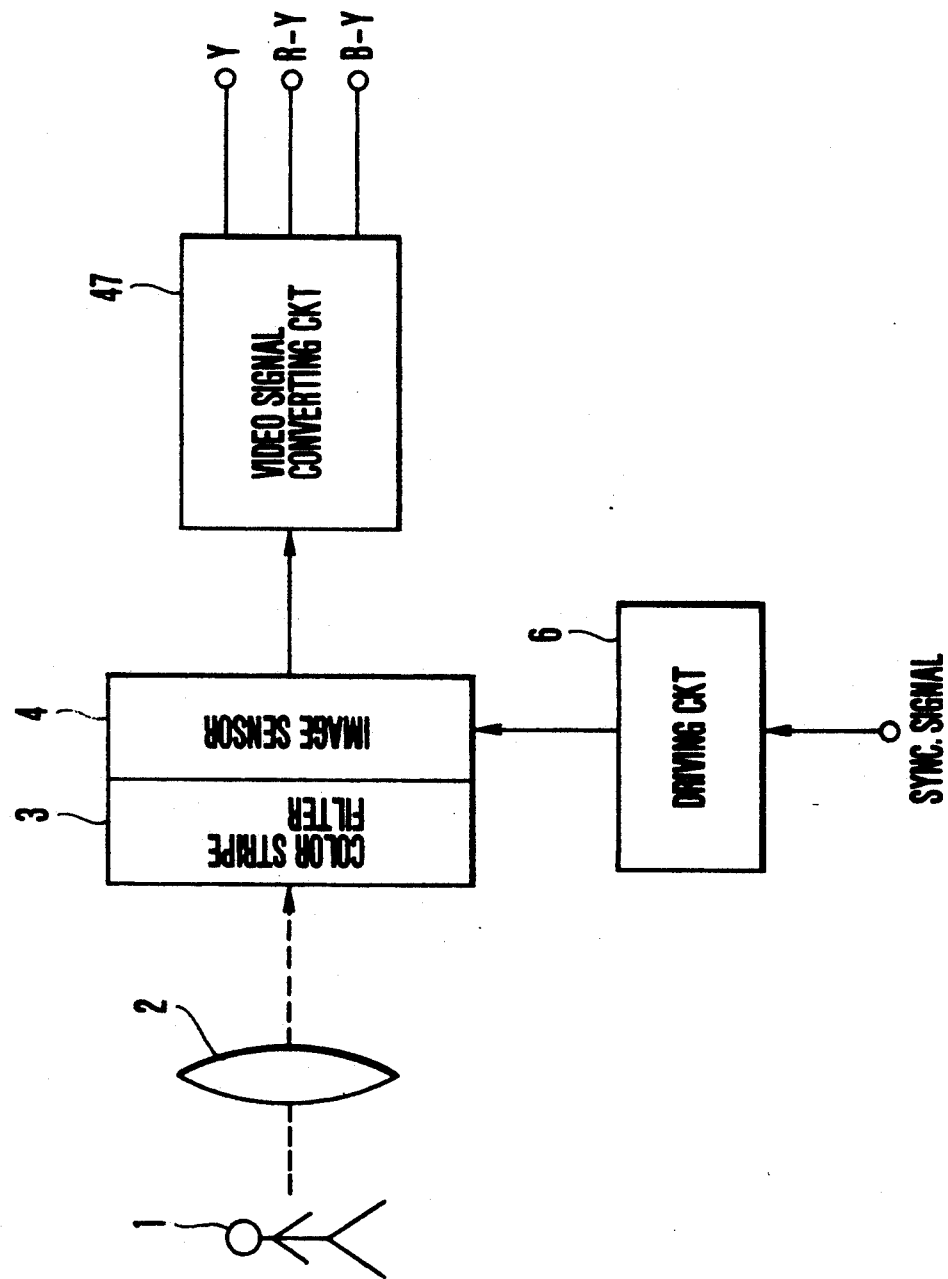
FIG. 6 is a diagram showing in outline an example of arrangement of the camera part of the camera-combined type VTR of FIG. 5.

FIGS. 5 and 6 show the arrangement of a camera-combined type VTR arranged as a third embodiment of this invention. The components which are the same as those shown in FIG. 1 are indicated by the same reference numerals and the details of them are omitted from the following description. Referring to FIGS. 5 and 6, the third embodiment performs a recording operation as follows:

In recording, a luminance signal Y and color difference signals R-Y and B-Y are supplied to the VTR part of the embodiment arranged as shown in FIG. 5. The VTR part then begins to perform a recording operation.

Referring to FIG. 6, the driving circuit 6 is arranged to drive the image sensor 4 to produce a video signal representing an object 1 in the same manner as in the case of FIG. 1. A video signal converting circuit 47 which is composed of a sample-and-hold circuit and a matrix circuit is arranged to convert the video signal into the luminance signal Y and the color difference signals R-Y and B-Y. These signals Y, R-Y and B-Y are then supplied to the VTR part which are arranged as shown in FIG. 5. A line 48 for the signal Y is connected to the first terminal (R) 49a of a flow passage change-over switch 49. The second terminal (PB) 49b of the switch 49 is connected to a line 50. A common plate 49c of the switch 49 is connected to the input terminal of a frequency multiplexing circuit 38. A quadrature two-phase modulation circuit 17 has a signal C output line 51 thereof connected to the first terminal (R) 52a of a flow passage change-over switch 52. The switch 52 has its second terminal (PB) 52b connected to a line 53 and its common plate 52c connected to the first terminal 54a of a flow passage change-over switch 54 which serves as a chroma gate. The common plate 54c of a switch 54 is connected to the input terminal of the frequency multiplexing circuit 38. The second terminal 54b of the switch 54 is connected to the ground. The switch 54 is arranged to have its connecting position controllable from outside.

The signal Y on the line 48 is arranged to be supplied to one of the input terminals of a comparison circuit 55. The other input terminal of the comparison circuit 55 is arranged to receive a threshold value Th1 for suppression of a high degree of luminance. The output terminal of the comparison circuit 55 is connected to the control input terminal of the switch 54 via the line 56. When the level of the signal Y on the line 48 exceeds the threshold value Th1, the common plate 54c of the switch 54 is connected to the second terminal 54b of the switch.

Meanwhile, a reproduced signal C on a line 53 is arranged to be supplied to one of the input terminals of a comparison circuit 57 which is arranged to serve as a mode discrimination circuit. The other input terminal of the comparison circuit 57 is arranged to receive a threshold value Th2 which is provided for cutting the chrominance signal. The output terminal of the comparison circuit 57 is connected via a line 58 to the control input terminal of the switch 54. When the level of the reproduced signal C on the line 53, i.e. the level of a color burst signal for example, is lower than the threshold value Th2, the common plate 54c of the switch 54 is connected to the second terminal 54b of the switch. A node between lines 56 and 58 functions as an OR gate. However, a flow passage change-over switch may be inserted and arranged to have the line 56 solely allowed to be connected to the control input terminal of the switch 54 when the VTR is in a recording mode and to have the line 58 alone allowed to be connected to the control input terminal of the switch 54. The third embodiment which is arranged as shown in FIG. 5 operates as described below:

In the case of a recording operation, a recording mode instructing signal is produced from a system controller (not shown) like in the case of FIG. 1. The common plates 49c and 52c of the switches 49 and 52 are respectively connected to the first terminals 49a and 52a. Meanwhile, in response to the instruction of the system controller, the connecting position of a change-over switch 69 which will be described later is shifted to one side R thereof in the recording mode. In this mode, a video signal representing an object is obtained from a video signal converting circuit 47. The signal Y of the video signal is supplied via a line 48 and a switch 49 to a frequency multiplexing circuit 38 and also to the comparison circuit 55. When the level of the signal Y is exceeding the threshold value Th1, the comparison circuit 55 produces a signal for opening the chroma gate 54.

Meanwhile, the quadrature two-phase modulation circuit 17 receives color-difference signals R-Y and B-Y from the video signal converting circuit 47 and quadrature two-phase modulates a subcarrier fsc produced from a synchronizing signal generating circuit 5. A carrier chrominance signal thus obtained is supplied to the first terminal 54a of the switch 54. The switch 54 (chroma gate) then restrains the passage of the signal C by connecting its common plate 54c to its second terminal 54b in response to the opening signal produced from the comparison circuit 55.

The frequency multiplexing circuit 38 is arranged to have the signal Y alone sent out to the line 59 in the event of suppressing high luminance. With the exception of this, the circuit 38 frequency multiplexes the signal Y and the signal C and sends them out on the line 59 in the form of a composite video signal of the NTSC color system. This NTSC composite video signal is supplied to a VTR recording circuit system 60 and, at the same time, also to a video signal output terminal Vout to enable the operator to confirm the image sensing state of the camera part through an external monitor TV set or the like.

The VTR recording circuit system 60 is arranged in a known manner to frequency modulate the luminance signal of the NTSC composite video signal, to convert the chrominance signal thereof into a low band and to magnetically record these signals in a multiplexed state. Since the details of the circuit system 60 are well known, the basic arrangement thereof is simply shown in FIG. 5. More specifically stated, the NTSC composite video signal on the line 59 is passed through a low-pass filter (LPF) 61 of about fc=2.5 to 3 MHz to take out the signal Y component together with a synchronizing signal. The output of the LPF 61 is then supplied to an automatic gain adjustment circuit (AGC) 62. The AGC 62 automatically adjusts the peak-to-peak amplitude value of the signal Y component to a value which coincides with a reference value. The signal Y component from the AGC 62 is supplied to a frequency modulation circuit 63 to be converted into a prescribed frequency modulated signal. Generally, a pre-emphasis is effected before the frequency modulation.

A band-pass filter (BPF) 64 arranged to allow a band of 3.58±0.5 MHz to pass and to produce the signal C component of 3.58 MHz. A chrominance signal amplitude automatic adjusting circuit (ACC) 65 is arranged to adjust the peak-to-peak value of the signal C component from the BPF 64 to a reference value by comparing the the amplitude of the color burst signal which should remain unvarying with a reference signal. A frequency converting circuit 66 uses a local oscillator (not shown) and is arranged to convert the frequency of 3.58 MHz of the signal C component produced from the ACC 65 into a predetermined low frequency band, such as 688 KHz in the case of the β system, 629 KHz in the case of the VHS system or 743 KHz in the case of the 8 mm video system. A frequency multiplexing circuit 67 is arranged to frequency multiplex the frequency modulated signal form the frequency modulation circuit 63 and the low-band carrier chrominance signal from the frequency converting circuit 66. A frequency multiplex signal thus obtained is amplified by an amplifier circuit 20. The amplified signal is then supplied to a magnetic head 22 via a change-over switch 21, which is on its connecting side R to allow it to be recorded on the magnetic tape 23.

In reproducing a video signal recorded on a magnetic tape, the system controller which is not shown produces a reproduction mode instruction signal like in the case of FIG. 1. This mode signal causes the common plates 49c and 52c of switches 49 and 52 to be connected to their second terminals 49b and 52b respectively. The connecting position of the change-over switch 69 is shifted to the side PB thereof. With the recorded signal reproduced from the magnetic tape 23 by means of the magnetic head 22, the reproduced signal from the head 22 is supplied to a high-pass filter (HPF) 68 to separate therefrom a frequency modulated signal corresponding to the signal Y. The separated signal is demodulated into the signal Y by a frequency demodulation circuit 69. The demodulated signal Y is sent out to a line 50. The reproduced signal is also supplied to a low-pass filter (LPF) 70 to separate a low-band carrier chrominance signal component therefrom. The separated signal is supplied to a frequency converting circuit 71. A circuit 71 then cooperates with a synchronizing signal generating circuit 72 and an APC-AFC circuit 73 to frequency convert the low-band carrier chrominance signal separated by the LPF 70 into a carrier chrominance signal of 3.58 MHz and supplies it to a line 53. The APC-AFC circuit 73 is arranged to automatically control the phase and the frequency of the chrominance signal in a known manner. The circuit 73 receives the output (a color burst signal) of the frequency converting circuit 71 and extracts from the output (the signal Y) of the frequency demodulation circuit 69 the horizontal synchronizing signal of the reproduced video signal. The circuit 73 is thus arranged to control the frequency converting circuit 71 on the basis of these outputs of the circuits 71 and 69.

The reproduced signal Y on the line 50 is supplied via a switch 49 to the frequency multiplexing circuit 38. Meanwhile, the reproduced signal C on the line 53 is supplied via a switch 52 to the first terminal 54a of the switch 54 and is also supplied to a comparison circuit 57. The comparison circuit 57 is arranged to determine the signal C to be in the B/W mode when the level of the color burst signal included in the signal C is lower than a given threshold value Th2. In that case, the circuit 57 produces an opening signal to the switch 54. Upon receipt of the opening signal from the comparison circuit 57, the common plate 54c of the switch 54 (which is a chroma gate) is connected to the second terminal 54a thereof. In that instance the reproduced signal C is not allowed to pass the switch 54.

In the event of the B/W mode, the frequency multiplexing circuit 38 sends out the reproduced signal Y alone to the line 59. In the case of the color mode, the circuit 38 frequency multiplexes the reproduced signals Y and C together and sends them out to the line 59 in the form of a composite video signal. The composite video signal on the line 59 is then supplied from a video signal output terminal Vout to an external monitor TV set or the like to have a reproduced image displayed thereon.

Before recombining the luminance signal and the chrominance signal separated from a picked-up or reproduced video signal after a required signal processing operation, the phase relation between the luminance signal and the chrominance signal must be kept unvarying. To meet this requirement, the embodiment of course includes delay circuits which are arranged to make phase adjustment as required at necessary points although they are not shown in the drawing.

Unlike the conventional arrangement, the third embodiment of this invention as described in the foregoing necessitates only a single circuit for restraining the supply of the chrominance signal in carrying out both the recording and reproducing operations. This arrangement of the embodiment permits simplification of circuits and, therefore, reduction in size, weight and the number of necessary circuit parts of the apparatus.

Figure 7:
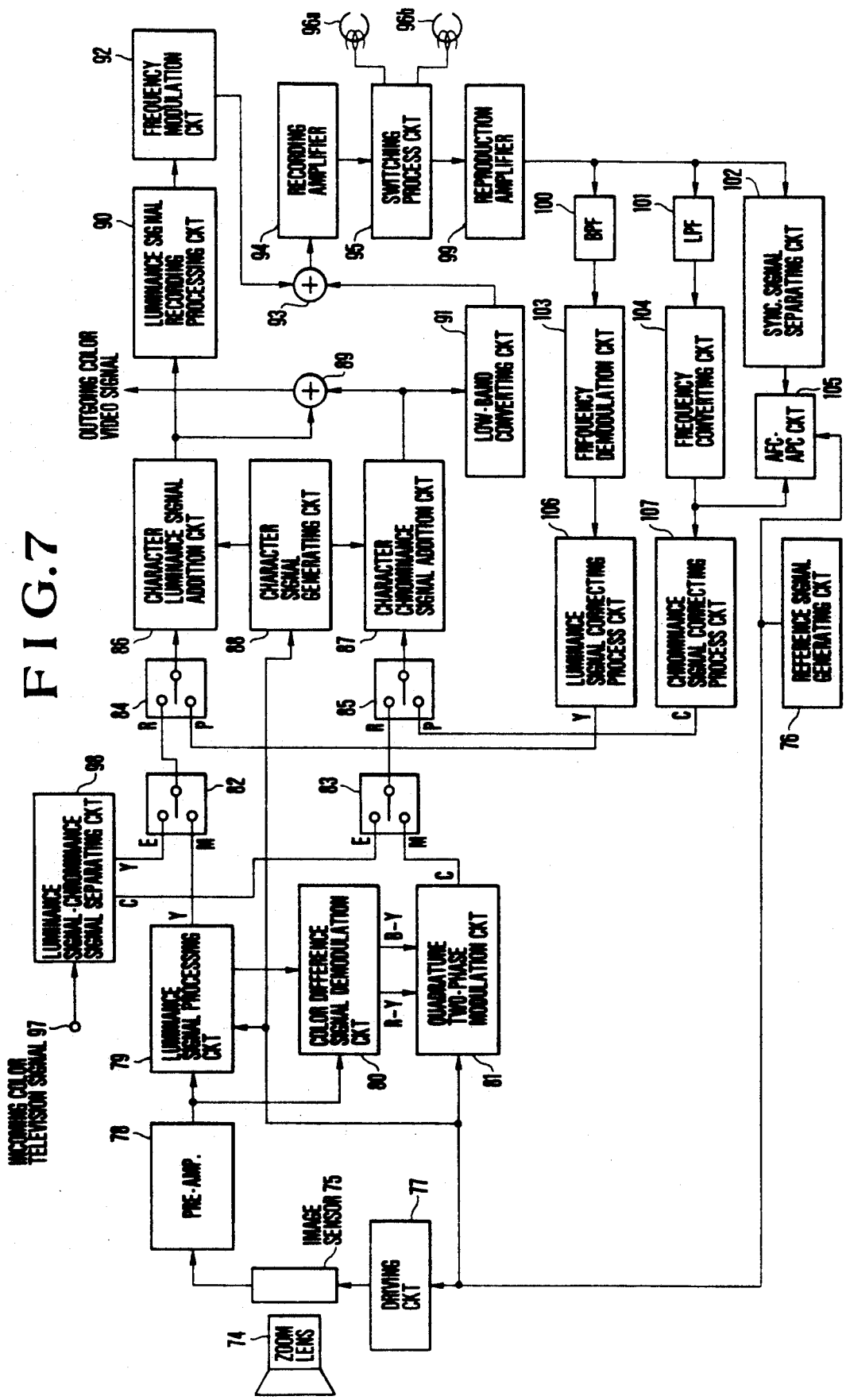
FIG. 7 is a block diagram showing in outline the arrangement of a camera-combined type VTR having a character generator arranged according to this invention as a fourth embodiment thereof.

FIG. 7 shows in outline the arrangement of a camera-combined type VTR arranged as a fourth embodiment of this invention. The recording operation of the VTR which is performed with a video camera part thereof is as follows: The image of an object is first picked up through a zoom lens 74. An optical image of the object is thus formed on the image sensing plane of an image sensor 75 via a color stripe vilter which is not shown but is disposed in front of the image sensing plane. The image sensor 75 forms a color video signal corresponding to the optical image of the object under a scanning control of a driving circuit 77 performed in accordance with a reference signal which is arranged, for example, to be at 3.58 MHz for a television signal of the NTSC color system and is generated by a reference signal generating circuit 76. The color video signal is supplied to a pre-amplifier 78 to be amplified there. The amplified signal is supplied to a luminance signal processing circuit 79 and a color difference signal demodulation circuit 80.

A luminance signal Y to which a synchronizing signal S is added is generated at the luminance signal processing circuit 79. Color difference signals R-Y and B-Y are generated at the color difference signal demodulation circuit 80 which consists of a sample-and-hold circuit, a matrix circuit, etc. At a quadrature two-phase modulation circuit 81, the color difference signals R-Y and B-Y are quadrature two-phase modulated into a carrier chrominance signal C using the reference signal from the above stated reference signal generating circuit 76.

The luminance signal Y and the carrier chrominance signal C which are obtained from the image sensor 75 in the above stated manner are supplied to the connecting sides M of change-over switches 82 and 83 respectively. In the case of recording with the video camera part, the connecting positions of these switches 82 and 83 are on their sides M according to an instruction received from a system controller which is not shown. This allows the luminance signal Y and the carrier chrominance signal C to be supplied to the connecting sides R of change-over switches 84 and 85 via the change-over switches 82 and 83 respectively. During recording, the connecting positions of these change-over switches 84 and 85 are on their sides R according to the instruction of the system controller. The luminance signal Y is supplied via the change-over switch 84 to a character luminance signal addition circuit 86. The carrier chrominance signal C is supplied via the change-over switch 85 to a character chrominance signal addition circuit 87.

A character signal generating circuit 88 is arranged to generate, in a well known manner in response to the instruction of the system controller (not shown), a color character video signal corresponding to characters denoting a title, date, time, etc. The circuit 88 provides a character luminance signal to the character luminance signal addition circuit 86. The circuit 86 then adds the character luminance signal to the luminance signal. Meanwhile, a character chrominance signal is provided from the circuit 88 to the character chrominance signal addition circuit 87. The circuit 87 then adds the character chrominance signal to the carrier chrominance signal C. Further, these character luminance and chrominance signals are added to the luminance signal Y and the carrier chrominance signal C in synchronism with each other in accordance with the reference signal generated by the above stated reference signal generating circuit 76.

The luminance signal Y with the character signal added thereto is supplied to a frequency multiplexing circuit 89 and a luminance signal recording processing circuit 40. The carrier chrominance signal C with the character signal added thereto is supplied to the frequency multiplexing circuit 89 and also to a low-band converting circuit 91. The frequency multiplexing circuit 89 frequency multiplexes the luminance signal Y and the carrier chrominance signal C to make them into a color video signal representing the object's image obtained from the image sensor 75. The color video signal is supplied to a color view finder which is not shown but is arranged to display thereon the image being picked up.

Meanwhile, the luminance signal recording processing circuit 90 performs a recording signal processing operation on the luminance signal Y received including a pre-emphasis process, etc. The luminance signal which is thus processed is frequency modulated by a frequency modulation circuit 92 and is supplied to a frequency multiplexing circuit 93. At the low-band converting circuit 91, the carrier chrominance signal C is frequency converted to a low band in a known manner. The low-band converted signal C is supplied also to the above stated frequency multiplexing circuit 93.

The frequency modulated luminance signal Y and the low-band converted carrier chrominance signal C are frequency multiplexed at the circuit 93. The output of the circuit 93 is amplified by a recording amplifier 94 and is then supplied to a switching process circuit 95 as a recording signal. The switching process circuit 95 is arranged to supply the recording signal alternately to magnetic heads 96a and 96b by switching it from one over to the other, for example, every 1/60 sec in the case where the signal corresponds to a TV signal of the NTSC color system. The signal is thus recorded on a magnetic tape which is not shown. The magnetic heads 96a and 96b are known rotary magnetic heads.

While the recording operation to be performed by means of the video camera part of the embodiment is as described above, the embodiment is arranged to be capable of recording also a TV signal by receiving it from an external apparatus such as a TV set. In recording such an external input, the embodiment operates as follows:

An incoming color TV signal coming via an external input terminal 97 is separated into a luminance signal Y and a carrier chrominance signal C by means of a luminance signal-chrominance signal separating circuit 98 which includes a filter, etc. The luminance signal Y is supplied to one connecting side E of the change-over switch 82 and the carrier chrominance signal C to that of the change-over switch 83. Meanwhile, in the case of external input recording, the positions of the switches 82 and 83 are on their connecting sides E respectively in response to the instruction of the system controller which is not shown. The luminance signal Y is then supplied to one connecting side R of the change-over switch 84 via the switch 82. The carrier chrominance signal C is supplied via the switch 83 t the connecting side R of the change-over switch 85. The ensuing recording operation is performed in the same manner as in the case of recording performed with the video camera part. A color character video signal is added to the incoming color TV signal before the color TV signal is recorded on a magnetic tape. The character adding device which is used in recording with the video camera part is arranged to be used also for recording an external input color TV signal. This permits simplification of the arrangement of the camera-combined type VTR for reduction in cost thereof.

The reproducing operation of the apparatus shown in FIG. 7 is as follows: The signal recorded on a magnetic tape in the manner as described in the foregoing is reproduced by the magnetic heads 96a and 96b. Signals thus reproduced by these heads are supplied to the switching process circuit 95. During reproduction, the switching process circuit 95 supplies a reproduction amplifier 99 alternately with the signals reproduced by these heads by switching them one over to another every 1/60 sec. The reproduction amplifier 99 produces an amplified reproduced signal.

The amplified signal is supplied to a BPF 100, an LPF 101 and a synchronizing signal separating circuit 102. The BPF 100 separates a frequency modulated luminance signal Y and supplies it to a frequency demodulation circuit 103. The LPF 101 separates a low-band converted carrier chrominance signal C and supplies it to a frequency converting circuit 104. The synchronizing signal separating circuit 102 separates a synchronizing signal S and supplies it to an automatic frequency control, phase control (AFC, APC) circuit 105.

The frequency demodulation circuit 103 demodulates the frequency modulated luminance signal Y and supplies it to a luminance signal correcting process circuit 106. The frequency converting circuit 104 removes a time base error (jitter) component from the reproduced carrier chrominance signal C which is in a state of having been low-band converted and converts the signal back into the original carrier chrominance signal C. The jitter removing action and the action to convert the signal to the original signal C are arranged to be performed by using a signal generated by the AFC-APC circuit 105. The carrier chrominance signal C which is thus restored is supplied to the chrominance signal correcting process circuit 107. The luminance signal correcting process circuit 106 and the chrominance signal correcting process circuit 107 are arranged to correct the signals Y and C in a known manner as they are deteriorated due to drop-outs, generation of noises, deterioration of a high frequency component, etc. which occur during the process of reproduction.

The reproduced luminance signal Y and the reproduced carrier chrominance signal C which have been thus corrected are respectively supplied to the connecting sides P of the change-over switches 84 and 85.

Further, during reproduction, the change-over switches 84 and 85 are on their connecting sides P. This allows the luminance signal Y to be supplied via the switch 84 to the character luminance signal addition circuit 86 and the carrier chrominance signal C via the switch 85 to the character chrominance signal addition circuit 87. Then, a color character video signal is added to each of these signals in the same manner as in recording.

The frequency multiplexing circuit 89 multiplexes the luminance signal Y and the carrier chrominance signal C to which the color character video signals have been added. As a result, a reproduced color video signal is produced from the circuit 89. Since the switching process circuit 95 is arranged to perform a switching action for reproduction, it never causes any erroneous recording.

As described above, the character adding device which is provided for the camera part is arranged to add color characters also to a color video signal reproduced from a magnetic tape.

The fourth embodiment is arranged to have the character signal of color information added to the video signal in the state of a carrier chrominance signal. This arrangement, however, may be changed. For example, the amount of color information carried by the characters can be increased without difficulty by adding the character signal by converting the carrier chrominance signal into a base band signal such as the signal R, G or B or a color difference signal R-Y or B-Y. Such modification also effectively prevents deterioration of the video signal due to the addition of a character signal.

Figure 8:
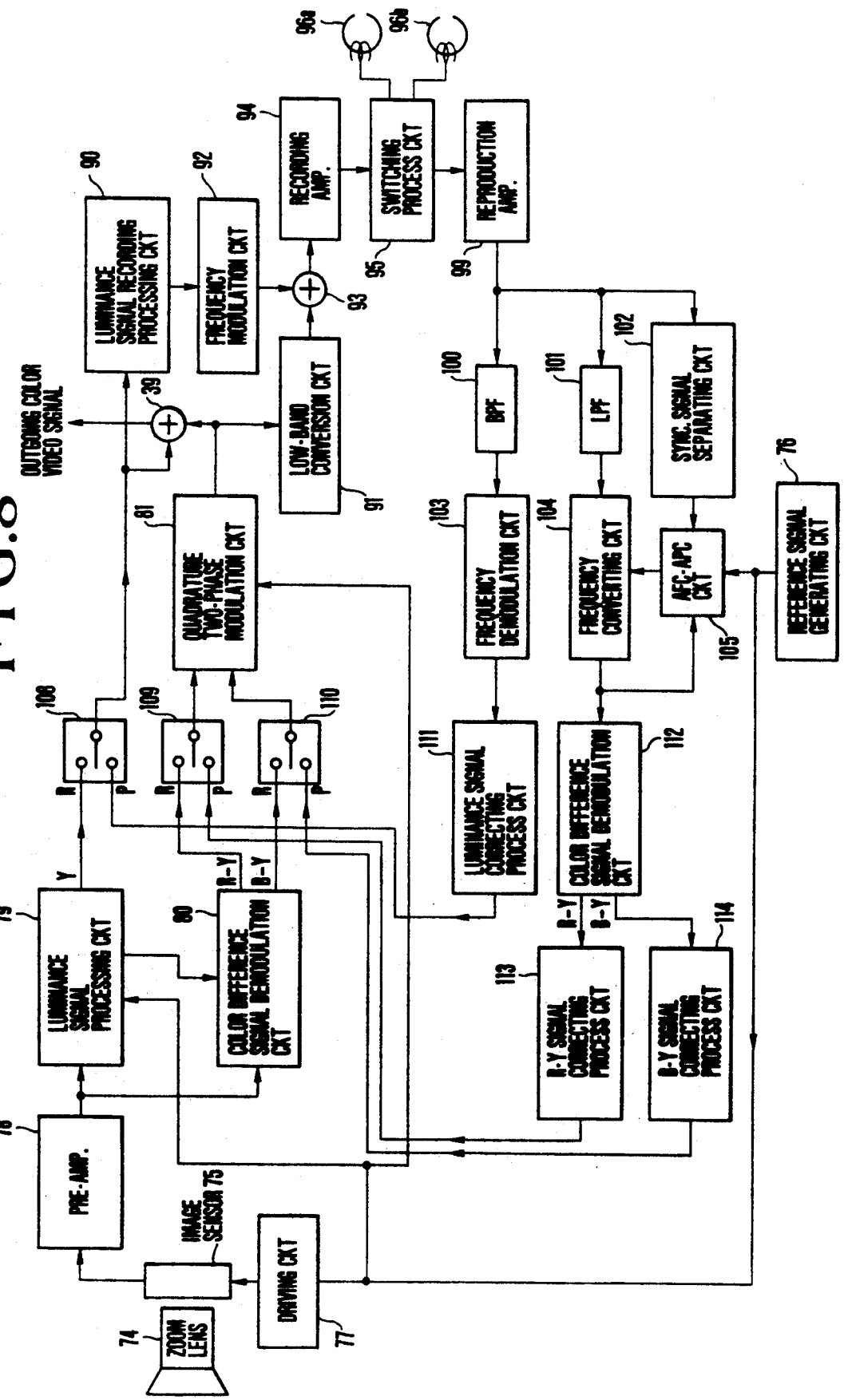
FIG. 8 is a block diagram showing in outline the arrangement of a camera-combined type VTR having a chrominance signal correction circuit arranged according to this invention as a fifth embodiment thereof.
Figure 9:
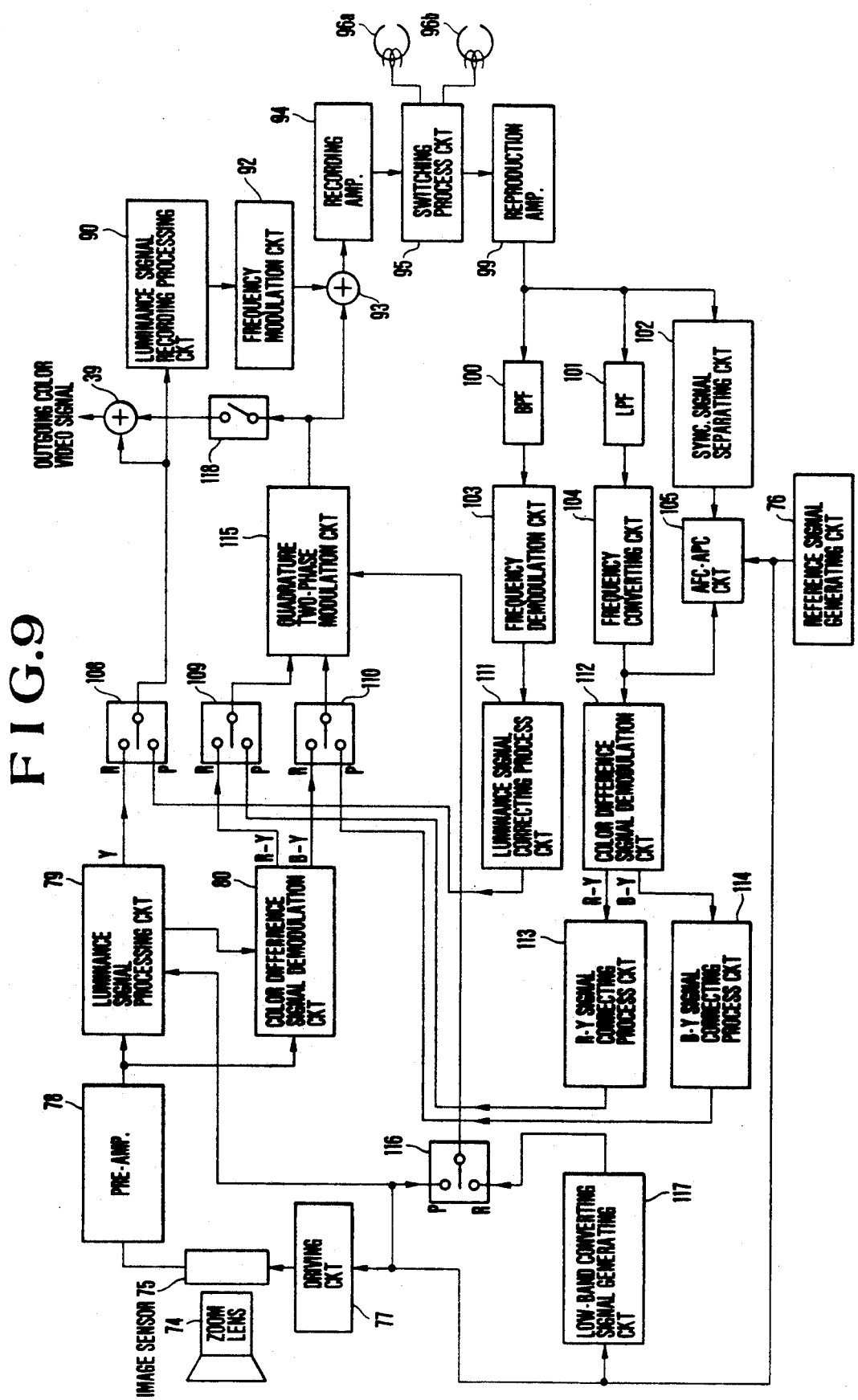
FIG. 9 is a block diagram showing in outline the arrangement of a camera-combined type VTR having a quadrature two phase modulation circuit arranged according to this invention as a sixth embodiment thereof.

FIGS. 8 and 9 show fifth and sixth embodiments of this invention. In FIG. 8, the arrangement of a camera-combined type VTR is shown in outline as the fifth embodiment. The same components as those of FIG. 7 are indicated by the same reference numerals and the details of them are omitted from the description given below:

Referring to FIG. 8, a luminance signal Y and color difference signals R-Y and B-Y are obtained from a signal produced from an image sensor 75 representing the optical image of an object like in the case of FIG. 7. The signal Y and the signals R-Y and B-Y are supplied to the connecting sides R of change-over switches 108, 109 and 110. In recording, the position of these switches 108, 109 and 110 are on their sides R in accordance with the instruction of a system controller which is not shown. The luminance signal Y is supplied, like in the case of FIG. 7, to a frequency multiplexing circuit 39 and a luminance signal recording processing circuit 90. The color difference signals R-Y and B-Y are supplied, also like in the case of FIG. 7, to a quadrature two-phase modulation circuit 81 to be quadrature two-phase modulated into a carrier chrominance signal C. The signal C is supplied to the frequency multiplexing circuit 39 and also to a low-band converting circuit 91.

The frequency multiplexing circuit 39 produces a color video signal for the object's image obtained from the image sensor 75. The image being picked up is displayed on a color view finder or the like which is not shown. Meanwhile, using the signals obtained from the luminance signal recording processing circuit 90 and the low-band converting circuit 91, the color video signal is recorded by magnetic heads 96a and 96b on a magnetic tape in the same manner as in the case of FIG. 7.

In reproducing a video signal recorded on a magnetic tape, the signal is reproduced by the magnetic heads 96a and 96b. Signals reproduced by these heads are supplied to a switching process circuit 95 which is arranged to perform a switching process for a reproducing operation. Then, like in the case of FIG. 7, a reproduced luminance signal Y is obtained from a frequency demodulation circuit 103 and a reproduced carrier chrominance signal C from a frequency converting circuit 104. The luminance signal Y is supplied to a luminance signal correcting process circuit 111 and the reproduced carrier chrominance signal C to a color difference signal demodulation circuit 112. The signal C is then demodulated into color difference signals R-Y and B-Y which are base band signals. The signal R-Y is supplied to an R-Y signal correcting process circuit 113 and the signal B-Y to a B-Y signal correcting process circuit 114 respectively.

The frequency modulated luminance signal Y and the low-band converted carrier chrominance signal which are reproduced from the magnetic tape and separated are thus brought back to the original luminance signal Y and color difference signals R-Y and B-Y which are base band signals. These base band signals are then supplied to their applicable correcting process circuits as described above. These correcting process circuits are arranged to perform their correcting operations as described below:

The signal reproduced from the magnetic tape is in a deteriorated state due to occurrence of a drop-out and a noise component and deterioration of a high frequency component. During a reproducing operation, therefore, the signal must be corrected. The luminance signal correcting process circuit 111, the R-Y signal correcting process circuit 113 and the B-Y signal correcting process circuit 114 are arranged to meet this requirement. For example, in compensation for a drop-out, a signal portion obtained prior to a present signal portion is stored by means of a one-horizontal-scanning-portion delay circuit or by some storage means such as a field or frame memory. Meanwhile, drop-out detecting means is arranged to detect the presence of any drop-out in the present portion of signal. In the event of detection of a drop-out, the previous portion of signal stored at the storage means is used to interpolate the drop-out portion of signal therewith. The drop-out compensation is arranged to be effected in an inconspicuous manner by storing some previous signal portion that is closely correlated with the present signal portion.

In removing a noise component, a one-horizontal-scanning-period (1-H) delay circuit or some storage means such as a field or frame memory is likewise arranged and the noise component is removed through a computing process by using a previous signal portion closely correlated with the present signal portion.

Further, for suppressing the deterioration of a high frequency component of the signal, a signal edge emphasizing process called an emphasis process is employed. In accordance with this process, an abruptly changing part of signal is detected and the level of that part is controlled in such a way as to prevent any bleeding or blurring from occurring at the edge parts of an image obtained by reproducing the signal.

The above stated correcting processes have been known and generally applied to a reproduced luminance signal. Although the correction processes are not limited to these methods described above, they may be carried out in the following manner: The carrier chrominance signal are demodulated by the color difference signal demodulation circuit 112 into color difference signals R-Y and B-Y which are base band signals. Then, a correcting process similar to the above stated correcting process for the luminance signal is carried out on these color difference signals R-Y and B-Y with the R-Y signal correcting process circuit 113 and the B-Y signal correcting process circuit 114. These correcting processes effectively lessen color bleeding or blurring of a reproduced picture and phase variations resulting from a computing process performed on signals having different time bases.

With the reproduction correcting processes having been carried out in the above stated manner, the luminance signal Y and the color difference signals R-Y and B-Y are supplied respectively to the connecting sides P of the change-over switches 108, 109 and 110. The switches 108, 109 and 110 are on their sides P in the reproduction mode in accordance with the instruction of the system controller which is not shown. The luminance signal Y is thus supplied to a frequency multiplexing circuit 39 and the color difference signals R-Y and B-Y to a quadrature two-phase modulation circuit 81 respectively.

In the same manner as in the preceding example of embodiment, the quadrature two-phase modulation circuit 81 is arranged to modulates the color difference signals R-Y and B-Y into a carrier chrominance signal C by using a reference signal generated by a reference signal generating circuit 76. The carrier chrominance signal C obtained by this modulation is supplied to the frequency multiplexing circuit 39 to be frequency multiplexed with the luminance signal Y. The multiplexed signals Y and C are then produced as a reproduced color video signal. In this instance, since the switching process circuit 95 is arranged to perform a switching action in the reproduction mode, it never performs a switching action for recording by mistake.

The fifth embodiment of this invention is thus arranged to demodulate the color difference signals R Y and B-Y into the carrier chrominance signal C using one and the same carrier chrominance signal modulation circuit both in recording a color video signal obtained by means of the image sensor and in reproducing a color video signal recorded on a magnetic tape. This feature advantageously simplifies the structural arrangement of the apparatus.

FIG. 9 shows in outline the arrangement of a camera-combined type VTR arranged as a sixth embodiment of this invention. In FIG. 9, the parts similar to those shown in FIG. 8 are indicated by the same reference numerals. In recording, a color video signal generated for the image of an object by an image sensor 75 is processed, like in the case of FIG. 8, is a pre-amplifier 78, a luminance signal processing circuit 79 and a color difference signal demodulation circuit 80. A luminance signal Y and color difference signals R-Y and B-Y thus obtained are respectively supplied to the connecting sides R of change-over switches 108, 109 and 110. In this instance, the connecting positions of these switches 108, 109 and 110 are on their sides R according to the instruction of a system controller which is not shown. The luminance signal Y is thus allowed to be supplied to a frequency multiplexing circuit 39 and also to a luminance signal recording processing circuit 90. The color difference signals R-Y and B-Y are supplied to a quadrature two-phase modulation circuit 115.

The quadrature two-phase modulation circuit 115 is arranged to quadrature two-phase modulate the color difference signals R-Y and B-Y to make them into a carrier chrominance signal C. In the case of this embodiment, the modulation in the recording mode is arranged to be performed with a reference signal which differs from a reference signal to be used for modulation in reproduction. In other words, a reference signal generated by a reference signal generating circuit 76 is supplied to the connecting side P of a change-over switch 116 and a low-band converting signal generating circuit 117. At the circuit 117, a horizontal synchronizing frequency signal is formed by using the reference signal supplied. Then, using this horizontal synchronizing frequency signal, the low-band converting signal generating circuit 117 generates a low-band converting color sub-carrier signal which is, for example, of 629 KHz in the case of a VTR of the VHS system or 688 KHz in the case of a VTR of the $\beta$ system. The phase of this low-band converting color sub-carrier signal is arranged to be either turned around 90 degrees or inverted 180 degrees at every one horizontal scanning period according to the known phase shift (PS) method or the known phase inverting (PI) method. This signal is supplied to the connecting side R of a change-over switch 116. The PS method is applied to a VTR of the VHS system and the PI method to a VTR of the $\beta$ system.

In the recording mode, the change-over switch 116 is on the connecting side R thereof in accordance with the instruction of the system controller which is not shown. The low-band converting signal which is generated by the low-band converting signal generating circuit 117 in the above stated manner is thus allowed to be supplied to the quadrature two-phase modulation circuit 115. The circuit 115 then quadrature two-phase modulates the color difference signals R-Y and B-Y using the low-band converting signal thus supplied. The circuit 115 thus generates a low-band converted carrier chrominance signal C. The signal C is supplied to a switch 118 and the frequency multiplexing circuit 93.

The switch 118 is controlled by the system controller to be in an ON state during a recording operation and in an OFF state during a reproducing operation. In this instance, therefore, the luminance signal Y is alone supplied to a frequency multiplexing circuit 39 and to a view finder which is not shown. The view finder then shows a picture being taken. Further, like in the case of FIG. 8, the luminance signal Y is processed by a luminance signal recording processing circuit 90 and a frequency modulation circuit 92 to be frequency modulated. The frequency modulated luminance signal Y is supplied to the frequency multiplexing circuit 93. The circuit 93 then multiplexes it with the low-band converted carrier chrominance signal C. The output of the circuit 93 is recorded on a magnetic tape in the same manner as in the case of FIG. 8.

The reproducing operation of the sixth embodiment is as follows: A luminance signal Y and color difference signals R-Y and B-Y are reproduced and processed by applicable circuits in the same manner as in the case of FIG. 8. Then, the processed signals are supplied to the connecting sides P of the change-over switches 108, 109 and 110, which are arranged to be on their sides P in the reproduction mode. Through these switches 108, 109 and 110, the luminance signal Y is supplied to the frequency multiplexing circuit 39 and the color difference signals R-Y and B-Y to the quadrature two-phase modulation circuit 115. Further, the change-over switch 116 is on its connecting side P in the reproduction mode according to the instruction of the system controller. Through this switch 116, a reference signal generated by the reference signal generating circuit 76 is supplied to the quadrature two-phase modulation circuit 115. The circuit 115 then quadrature two-phase modulates the color difference signals R-Y and B-Y to make them into a carrier chrominance signal C. The signal C is supplied to the switch 118.

In the reproduction mode, the switch 118 is set in an ON state by the system controller which is not shown as mentioned above. The carrier chrominance signal C which is produced from the quadrature two-phase modulation circuit 115 is supplied via the switch 118 to the frequency multiplexing circuit 39. The circuit 39 frequency multiplexes the luminance signal Y and the carrier chrominance signal C and produces them as a reproduced color video signal. Further, since the switching process circuit 95 is arranged, in the same manner as in the case of FIG. 8, to perform a switching action for reproduction, it never causes recording to be made by mistake.

As described above, in recording the color video signal obtained from the image sensor, the color difference signals R-Y and B-Y which are obtained from the image information signal for the object are modulated by means of the low-band converting signal at the carrier chrominance signal modulation circuit in such a way as to give a low-band converted carrier chrominance signal. In carrying out a reproducing operation on a video signal recorded on a magnetic tape, the color difference signals R-Y and B-Y obtained from the signal reproduced from the tape is modulated into a normal carrier chrominance signal by means of the same carrier chrominance signal modulation circuit. This feature of the sixth embodiment permits further simplification of the apparatus as it obviates the necessity of any additional arrangement for low-band conversion of the carrier chrominance signal in recording.

Figure 10:
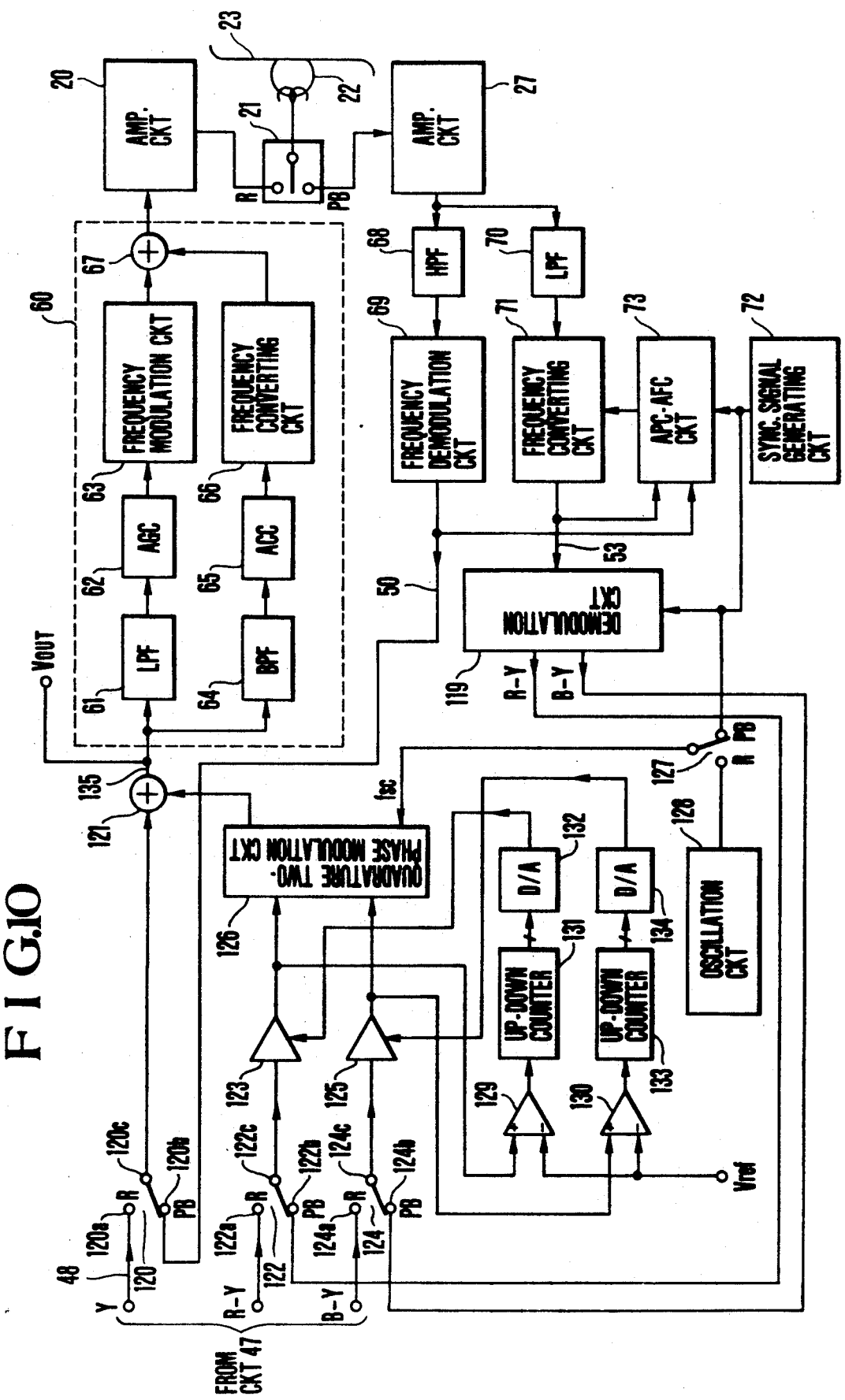
FIG. 10 is a block diagram showing in outline the arrangement of a camera-combined type VTR having a white balance circuit arranged according to this invention as a seventh embodiment thereof.

FIG. 10 shows in outline the arrangement of a camera-combined type VTR arranged as a seventh embodiment of this invention. In FIG. 10, the same members and parts as those shown in FIGS. 5 and 6 are indicated by the same reference numerals and the details of them are omitted from the following description.

Referring to FIG. 10, a chrominance signal C which is on the output line 53 of a frequency conversion circuit 71 of a reproducing circuit system is arranged to be supplied to a demodulation circuit 119 to be demodulated into color difference signals R-Y and B-Y there. A line 48 which is arranged for a luminance signal Y coming from a video signal conversion circuit 47 which is arranged as shown in FIG. 6 is connected to R (recording) terminal 120a of a flow change-over switch 120. To the PB (reproduction) terminal 120b of the switch 120 is connected a line 50 leading to a frequency demodulation circuit 69 of the reproducing circuit system. The common plate 120c of the switch 120 is connected to the input terminal of a frequency multiplexing circuit 121. A line for a color difference signal R-Y from the video signal conversion circuit 47 is connected to an R terminal 122a of a change-over switch 122. The PB terminal 122b of the switch 122 is connected to a line for a color difference signal R-Y from a demodulation circuit 119. The common plate 122c of the switch 122 is connected to the input terminal of a variable gain amplifier 123. A line for a color difference signal B-Y from the video signal conversion circuit 47 is connected to the R terminal 124a of a change-over switch 124. The PB terminal 124b of the switch 124 is connected to a line for a color difference signal B-Y from the demodulation circuit 119. The common plate 124c of the switch 124 is connected to the input terminal of a variable gain amplifier 125.

Further, in re-modulating a reproduced signal, it is necessary to obtain information on the reproduced signal. Therefore, a switch 127 is arranged to selectively supply a sub-carrier fsc to the quadrature two-phase modulation circuit 126 by effecting switch-over between the output of an oscillation circuit 128 and that of a synchronizing signal generating circuit 72 to selectively supply one of them as the sub-carrier fsc. All the switches 120, 122, 124 and 217 are arranged to be set by the instruction of the system controller which is not shown, on their connecting sides R in recording and on their other connecting sides PB in the case of reproduction. The seventh embodiment which is shown in FIG. 10 operates in the following manner:

In the recording operation mode: When an instruction for a recording operation reproduced from the system controller which is not shown, the common plates 120c, 122c and 124c of the switches 120, 122 and 124 are respectively connected to their R terminals 120a, 122a and 124a. The connecting position of the switch 127 is shifted to its one side R. In this recording mode, the video signal conversion circuit 47 of the camera part mentioned in the foregoing with reference to FIG. 6 sends a video signal representing an image of an object. The luminance signal Y of the video signal comes via the line 48 and the switch 120 to the frequency multiplexing circuit 121. The color difference signal R-Y of the video signal from the video signal converting circuit 47 is applied to one of the input terminals of the quadrature two-phase modulation circuit 126 via the switch 122 and the variable gain amplifier 123. The color difference signal B-Y of the video signal is applied to the other input terminal of the circuit 126 via the switch 124 and the variable gain amplifier 125.

The output of the variable gain amplifier 123 is supplied to a comparison circuit 129 to be compared with a reference voltage Vref provided for white balance adjustment. The output of the amplifier 125 is supplied to another comparison circuit 130 to be compared also with the white balance reference voltage Vref. An up-down counter 131 is arranged to up count either reference clock pulses or the output of the comparison circuit 129 in the event of a negative output of the circuit 129 and to down count the reference clock pulse for the output of the circuit 129 when the output is positive. A D/A (digital-to-analog) converter 132 is arranged to convert the count value of the counter 131 into an analog value at suitable time intervals. The analog value thus obtained is sent to the gain control input terminal of the variable gain amplifier 123. The gain of the variable gain amplifier 123 increases or decreases according to the output of the D/A converter 132. The output of the other comparison circuit 130 is arranged likewise to be supplied to the gain control input terminal of the variable gain amplifier 125 via an up-down counter 133 and a D/A converter 134. The gain of the amplifier 125 is likewise controlled. These circuit elements are thus arranged to perform feedback control for white balance adjustment.

More specifically, a white balance circuit is formed by the variable gain amplifiers 123 and 125, the comparison circuits 129 and 130, the up-down counters 131 and 133 and the D/A converters 132 and 134. The white balance is thus controlled to be unvarying relative to the reference voltage Vref through gain control effected by a feedback loop.

The quadrature two-phase modulation circuit 126 forms a carrier chrominance signal C by quadrature two-phase modulating the sub-carrier fsc of 3.58 MHz from the oscillation circuit 128 with the two color difference signals R-Y and B-Y coming from the amplifiers 123 and 125. The signal C thus obtained is supplied to the frequency multiplexing circuit 121.

At the frequency multiplexing circuit 121, the luminance signal Y coming via the line 48 and the carrier chrominance signal C from the quadrature two-phase modulation circuit 126 are frequency multiplexed and produced to an output line 135 as a composite video signal of the NTSC color system. The NTSC composite video signal on the line 135 is supplied to a VTR recording circuit system 60. The recording circuit system 60 then magnetically record the composite video signal on a magnetic tape 23 through the frequency converting and low-band converting processes in the same manner as described in the foregoing with reference to FIG. 5. Meanwhile, the composite video signal on the line 135 is also supplied from an output terminal Vout to an external monitor.

In the reproducing operation mode: The common plates 120c, 122c and 124c of the switches 120, 122 and 124 are connected respectively to their PB terminals 120b, 122b and 124b and the connecting position of the switch 127 is shifted to the side PB thereof in accordance with the instruction of the system controller which is not shown. When the record on a magnetic tape 23 is reproduced under this condition, a luminance signal Y and a carrier chrominance signal C are obtained from a reproduced video signal produced from a magnetic head 22.

The reproduced signal Y which is on a line 50 is supplied via the switch 120 to the frequency multiplexing circuit 121. The reproduced signal C which is on a line 53 is supplied to a demodulation circuit 119 to be demodulated back into color difference signals R-Y and B-Y. The signal R-Y is supplied via a variable gain amplifier 123 to one of the input terminals of the quadrature two-phase modulation circuit 126. The signal B-Y is supplied to the other input terminal of the circuit 126 via the switch 124 and a variable gain amplifier 125. The amplifiers 123 and 125 perform feedback control to make the amplitude of the color difference signals R-Y and B-Y unvarying in the same manner as in recording.

The quadrature two-phase modulation circuit 126 modulates the reproduced color difference signals under the condition of the frequency and phase of the synchronising signal generating circuit 72 of a reproducing circuit system. The output of the circuit 126 is then supplied to the frequency multiplexing circuit 121.

The frequency multiplexing circuit 121 frequency multiplexes the reproduced signal Y coming from the line 50 and the reproduced signal C coming from the quadrature two-phase modulation circuit 126 to make them into a composite video signal of the NTSC color system. The composite video signal is then sent out to an external monitor via the line 135 and the output terminal Vout.

The video signal obtained by the image sensor or the video signal reproduced from the magnetic tape is thus separated into the luminance signal and the color difference signals and after that they are reunited as mentioned above. In this instance, the phase relation between the luminance signal and the color difference signals must be kept unvarying. In cases where phase adjustment is necessary to meet this requirement, it goes without saying that delay circuits are arranged in apposite positions although they are not shown in FIG. 10.

In the case of FIG. 10, an up-down counter which is a digital circuit is used for feedback control over the amplitude of each of the color difference signals. However, the use of the up-down counter obviously may be replaced with some analog circuit, such as an integrating circuit. Further, the frequency multiplexing circuit 121 is arranged to be used both for recording and for reproduction. However, this arrangement may be changed to provide an additional frequency multiplexing circuit on the line 50 and to supply the output of the quadrature two-phase modulation circuit 126 to the frequency multiplexing circuit 121 in the case of the recording mode and to the additional frequency multiplexing circuit in the reproduction mode. In the event of this modification, a change-over switch must be arranged to switch the connection of the video signal output terminal Vout to the output terminal of the frequency multiplexing circuit 121 and to that of the additional frequency multiplexing circuit from one over to the other.

In the seventh embodiment described, a common voltage is used as the reference voltage Vref for both the comparison circuits 129 and 130. That arrangement may be changed to use different voltages or to arrange such reference voltages to be manually adjustable.

In the case of the seventh embodiment, the camera combined type VTR has one and the same white balance circuit arranged to be usable both for recording and reproduction by switching the signal supply to the white balance circuit from the color difference signals of the image sensing video signal over to those of the reproduced video signal and vice versa. This arrangement enables the VTR to make white balance adjustment also for the reproduced video signal and thus permits reduction in size, weight and cost of the apparatus.

Figure 11:
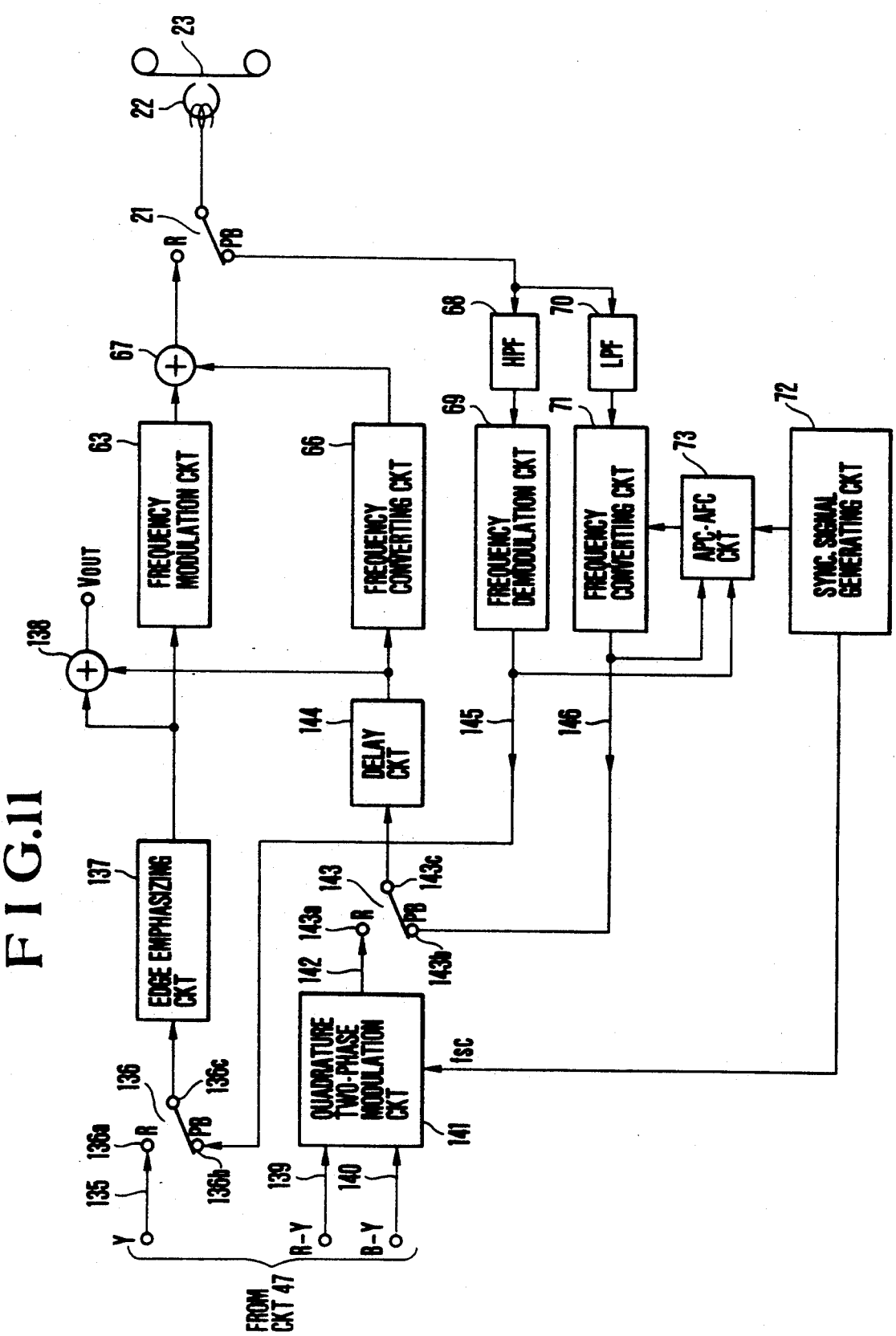
FIG. 11 is a block diagram showing a camera-combined type VTR having an edge emphasizing circuit arranged according to this invention as an eighth embodiment thereof.
Figure 12:
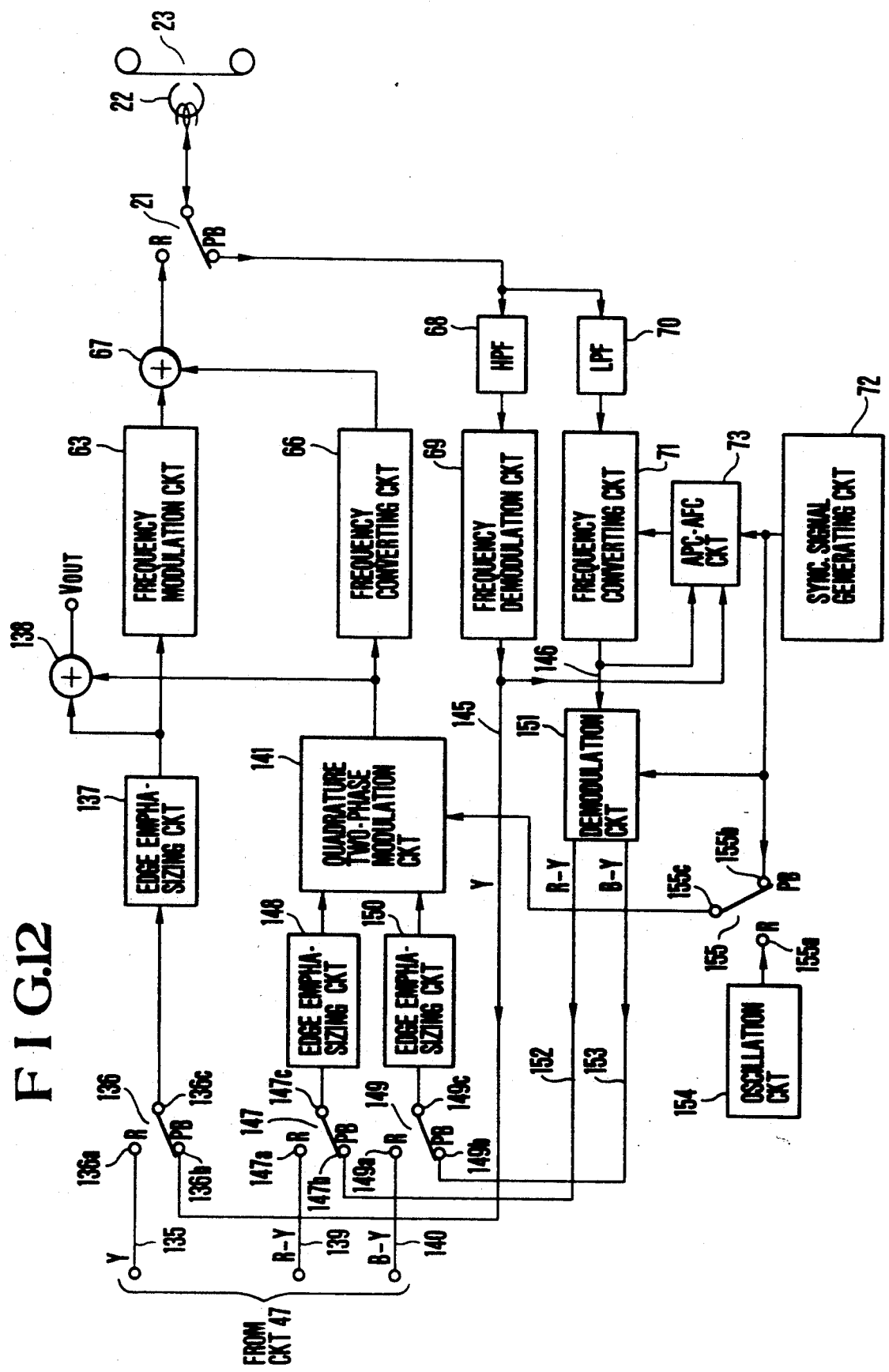
FIG. 12 is a block diagram showing in outline the arrangement of a camera-combined type VTR having another edge emphasizing circuit arranged according to this invention as a ninth embodiment thereof.

FIGS. 11 and 12 show in outline the arrangement of camera-combined type VTRs as eighth and ninth embodiments of this invention. In these drawings, the same components and parts as those shown in FIGS. 5 and 6 are indicated by the same reference numerals and the details of them are omitted from the following description.

Referring to FIG. 11, the eighth embodiment is arranged as follows: A line 135 is connected to the R terminal 136a of a change-over switch 136. The common plate 136c of the switch 136 is connected to the input terminal of a luminance signal edge emphasizing circuit 137. The output terminal of the circuit 137 is connected to the input terminal of a frequency modulation circuit 63 and also to one of the input terminals of a frequency multiplexing circuit 138.

A color difference signal R-Y on a line 139 and a color difference signal B-Y on a line 140 are arranged to be supplied to a quadrature two-phase modulation circuit 141. The circuit 141 is arranged to receive a sub-carrier fsc of 3.58 MHz from a synchronizing signal generating circuit 72 in addition to the color difference signals. The circuit 141 quadrature two-phase modulates the sub-carrier fsc with the two color difference signals R-Y and B-Y to form thereby a carrier chrominance signal C. The signal C is produced on a line 142.

The line 142 is connected to the R terminal 143a of a switch 143. The common plate 143c of the switch 143 is connected to the input terminal of a delay circuit 144. The delay circuit 144 is arranged to delay the signal C as much as a period of time for which the luminance signal Y is delayed through the edge emphasizing circuit 137. The output terminal of the delay circuit 144 is connected to the other input terminal of the frequency multiplexing circuit 138 and also to the input terminal of a frequency conversion circuit 66 which is arranged to change the frequency of the signal C from 3.58 MHz to 743 KHz for recording it at a low frequency band.

The frequency multiplexing circuit 138 produces a composite video signal of the NTSC color system which is arranged to be supplied to an external monitor TV set or an electronic view finder via a video output terminal Vout.

The output terminal of the frequency modulation circuit 63 is connected to one of the input terminals of a frequency multiplexing circuit 67. The output terminal of a frequency conversion circuit 66 is connected to the other input terminal of the circuit 67. The frequency multiplexing circuit 67 is arranged to form a multiplex signal to be recorded on a magnetic tape. The output terminal of the frequency multiplexing circuit 67 is connected to one connecting side R of a change-over switch 21. The output terminal of the switch 21 is connected to a magnetic head 22. The magnetic head 22 is arranged to record a video signal on a magnetic tape 23 or to reproduce a video signal recorded on the tape and to supply the reproduced signal to the switch 21.

The recording circuit system described above further includes an automatic gain adjustment circuit (AGC) which is arranged to adjust the peak-to-peak value of the amplitude of the luminance signal component of the video signal to a reference value; a circuit which is arranged to pre-emphasize the luminance signal Y when this signal Y is frequency modulated; and a chrominance signal amplitude automatic adjustment circuit (ACC) which is arranged to adjust the peak-to-peak value of the chrominance signal component produced from the delay circuit 44 to a reference value by comparing the amplitude of the color burst signal thereof which should be unvarying with the reference signal. These circuit elements are disposed in suitable positions within the circuit system. However, since they are not directly related to this embodiment, the details of them are omitted from the description here.

The VTR includes a reproducing circuit system, which is arranged as follows: Another connecting side PB of the switch 21 is connected to the input terminal of an HPF 68 which is arranged to extract a modulated luminance signal component from a reproduced signal. The output terminal of the HPF 68 is connected to the input terminal of a frequency demodulation circuit 69 which is arranged to demodulate the frequency modulated luminance signal. The output terminal of the frequency demodulation circuit 69 is connected to the PB terminal 136b of the switch 43. The connecting side PB of the switch 21 is connected also to the input terminal of an LPF 70 which is arranged to extract from the reproduced signal a low-band carrier chrominance signal component. The output terminal of the LPF 70 is connected to the input terminal of a frequency conversion circuit 71 which is arranged to convert the frequency band of the low-band carrier chrominance signal to a frequency band of 3.58 MHz. The output of the circuit 71 is arranged to be supplied to the PB terminal 143b of a switch 143.

The frequency conversion circuit 71 frequency converts the low-band carrier chrominance signal to the carrier chrominance signal of 3.58 MHz under the control of s synchronizing signal generating circuit 72 and an APC-PFC circuit 73. The APC-AFC circuit 73 is arranged to automatically control the phase and frequency of the chrominance signal by receiving the output (particularly a color signal) of the frequency conversion circuit 71 and a horizontal synchronizing signal included in the output (luminance signal Y) of the frequency demodulation circuit 69. The operation of the frequency conversion circuit 71 is thus controlled on the basis of these inputs of the circuit 73. The eighth embodiment shown in FIG. 11 operates in the following manner:

In an image sensing recording operation mode: The common plates 136c and 143c of switches 136 and 143 are respectively connected to their R terminals 136a and 143a. Meanwhile the switch 21 is on its connecting side R. The video signal conversion circuit 47 of the camera part of the VTR which is arranged as shown in FIG. 6 produces a video signal obtained by sensing an image of an object. The luminance signal included in the video signal is supplied to the edge emphasizing circuit 137 to have its edge part emphasized by the circuit 137. The edge emphasized luminance signal Y is then supplied to the frequency modulation circuit 63 and the frequency multiplexing circuit 138. The circuit 63 supplies a frequency modulated luminance signal Y to the frequency multiplexing circuit 67.

Meanwhile, the quadrature two-phase modulation circuit 141 receives color difference signals R-Y and B-Y from the above stated video signal conversion circuit 47 and a sub-carrier fsc from the synchronizing signal generating circuit 72. The circuit 141 then quadrature two-phase modulate the sub-carrier fsc with the color difference signals R-Y and B-Y and thus produces a carrier chrominance signal. The carrier chrominance signal is then supplied via a delay circuit 144 to the frequency conversion circuit 66 and the frequency multiplexing circuit 138. The frequency conversion circuit 66 converts the carrier chrominance signal into a low-band carrier chrominance signal of a low frequency of 743 KHz. The low-band carrier chrominance signal is supplied to the other input terminal of the frequency multiplexing circuit 67. The other frequency multiplexing circuit 138 produces a composite video signal of the NTSC color system, which is supplied from the video output terminal Vout to an external monitor TV set or an electronic view finder or the like and is used for monitoring the recording operation on the image of the object sensed.

Meanwhile the output of the frequency multiplexing circuit 67 is applied via the switch 21 to the head 22 to be recorded on a magnetic tape 23.

In a reproducing operation mode: The common plates 136c and 143c of the switches 136 and 143 are connected to their PB terminals 136b and 143b respectively in response to the instruction of the system controller which is not shown. Meanwhile, the switch 21 shifts its position to the connecting side PB thereof. When a recorded video signal is reproduced from the magnetic tape 23, a luminance signal Y and a carrier chrominance signal C are obtained from the reproduced signal produced from the magnetic head 22 in the same manner as in the case of FIG 5. The luminance signal Y is produced on the output line 145 of the frequency demodulation circuit 69. The carrier chrominance signal C is produced on the output line 146 of the frequency conversion circuit 71.

The reproduced signal Y on the line 145 is supplied via the switch 136 to the edge emphasizing circuit 137 to undergo an edge emphasizing process in the same manner as in the case of the recording mode. The reproduced signal C on the line 146 is supplied via the switch 143 to the delay circuit 144 to be adjusted there to the time delay of the signal Y resulting from the edge emphasizing process performed by the circuit 137.

The luminance signal Y produced from the edge emphasizing circuit 137 is applied to the frequency multiplexing circuit 138. The carrier chrominance signal C produced from the delay circuit 144 is also applied to the frequency multiplexing circuit 138. Then, the frequency multiplexing circuit 138 produces a composite video signal of the NTSC color system of the reproduced video signal via the video output terminal Vout to the external monitor device.

FIG. 12 shows the ninth embodiment of this invention. In this case, the invention is applied to a VTR arranged, unlike the eighth embodiment, to perform an edge emphasizing process not only on a luminance signal but also on color difference signals obtained by demodulating a reproduced chrominance signal C. In FIG. 12, the same components and parts of those of FIG. 11 is indicated by the same reference numerals.

Referring to FIG. 12, a color difference signal R-Y producing line 139 is connected to the R terminal 147a of a change-over switch 147. The common plate 147c of the switch 147 is connected to the input terminal of an edge emphasizing circuit 148. The output terminal of the circuit 147 is connected to the signal R-Y input terminal of a quadrature two-phase modulation circuit 141. Meanwhile a color difference signal B-Y output line 140 is connected to the R terminal 149a of a change-over switch 149. The common plate 149c of the switch 149 is connected to the input terminal of an edge emphasizing circuit 150. The output terminal of the edge emphasizing circuit 150 is connected to the signal B-Y input terminal of the quadrature two-phase modulation circuit 141.

The output line 146 of a frequency conversion circuit 71 is connected to the input terminal of a demodulation circuit 151 which is arranged to demodulate the chrominance signal C into color difference signals R-Y and B-Y. The signal R-Y output line 152 of the demodulation circuit 151 is connected to the PB terminal 147b of the switch 147. The signal B-Y output line 153 of the circuit 151 is connected to the PB terminal 148b of the switch 149. The demodulation circuit 151 is arranged to demodulate the chrominance signal C under the control of the phase and frequency of a sub-carrier fsc obtained from a synchronizing signal generating circuit 72.

The quadrature two-phase modulation circuit 141 is arranged to convert the demodulated color difference signals of the reproduced video signal back into a chrominance signal C. For this purpose, the circuit 141 must have information on the phase of the reproduced signal. Therefore, a switch 155 is arranged to supply the sub-carrier fsc to the circuit 141 either from an oscillation circuit 154 or from the synchronizing signal generating circuit 72 by switching its connecting position from one position over to the other. More specifically, the R terminal 155a of the switch 155 is connected to the output terminal of the oscillation circuit 154 and the PB terminal 155b of the switch 155 to the output terminal of the synchronizing signal generating circuit 72 while the common plate 155c of the switch is connected to the sub-carrier fsc input terminal of the above stated circuit 141.

Time delay due to the edge emphasizing process performed on the reproduced luminance signal Y by the edge emphasizing circuit 137 is arranged to be balanced with time delay due to the edge emphasizing process performed on the reproduced color difference signals by edge emphasizing circuits 148 and 150. In the case of this embodiment, the delay circuit 144 which is disposed on the output side of the quadrature two-phase modulation circuit 141 of FIG. 11 may be dispensed with. Further, it is obviously unnecessary in this case to have the switch 143 of FIG. 11. Hence the output terminal of the quadrature two-phase modulation circuit 141 is connected to the input terminal of a frequency conversion circuit 66.

The rest of the circuit connection arrangement of this embodiment is identical with that of FIG. 11.

The ninth embodiment shown in FIG. 12 operates in the following manner: In an image sensing recording operation mode: The common plates 136c, 147c, 149c and 155c of switches 136, 147, 149 and 155 are connected to their R terminals 136a, 147a, 149a and 155a respectively in accordance with the instruction of a system controller which is not shown. The position of the switch 21 shifts to its connecting side R. The video signal conversion circuit 47 of the camera part of the VTR which is arranged as described in the foregoing with reference to FIG. 6 produces a luminance signal Y. The signal Y is supplied to the edge emphasizing circuit 137 to have its edge part emphasized there. The edge emphasized luminance signal is supplied to the frequency multiplexing circuit 138 and is also to another frequency multiplexing circuit 67 through the frequency modulation circuit 63.

Meanwhile, the video signal conversion circuit 47 also produces color difference signals R-Y and B-Y. The signals R-Y and B-Y are supplied to the edge emphasizing circuits 148 and 150 to have their edge parts emphasized there. The edge emphasized signals R-Y and B-Y are applied to the quadrature two-phase modulation circuit 141. Using these signals R-Y and B-Y, the circuit 141 quadrature two-phase modulates a sub-carrier fsc obtained from the oscillation circuit 154 and thus produces a carrier chrominance signal. The carrier chrominance signal is supplied to the frequency multiplexing circuit 138 and also to the other frequency multiplexing circuit 67 via the frequency conversion circuit 66.

The frequency multiplexing circuit 138 produces a composite video signal of the NTSC system, which is supplied via a video output terminal Vout to an external monitor TV set or the like to be used for the purpose of monitoring the image sensing recording operation. The output of the other frequency multiplexing circuit 67 is applied via the switch 21 to the magnetic head 22 for magnetic recording on a magnetic tape 23.

The reproducing operation mode of the VTR: The common plates 136c, 147c, 149c and 155c of the switches 136, 147, 149 and 155 are connected to their PB terminals 136b, 147b, 149b and 155b respectively. When a video signal recorded on a magnetic tape 23 is reproduced, a luminance signal Y is produced on the output line 145 of the frequency demodulation circuit 69 and a chrominance signal C on the output line 146 of the frequency conversion circuit 71 respectively like in the case of the preceding example embodiment described in the foregoing.

The reproduced signal Y on the line 145 is supplied via the switch 136 to the edge emphasizing circuit 137 to undergo an edge emphasizing process in the same manner as in the case of the image sensing recording mode. The reproduced signal C on the line 146 is demodulated into color difference signals R-Y and B-Y by the demodulation circuit 151. The color difference signal R-Y is supplied to the edge emphasizing circuit 148 via a line 152 and the switch 147. The other color difference signal B-Y is supplied to the edge emphasizing circuit 150 via a line 153 and the switch 149. The two edge emphasizing circuits 148 and 150 edge emphasize the color difference signals R-Y and B-Y. The edge emphasized color difference signals R-Y and B-Y are then quadrature two-phase modulated back into the signal C by the quadrature two-phase modulation circuit 141. The signal C is then supplied to the frequency multiplexing circuit 138.

The frequency multiplexing circuit 138 frequency multiplex the reproduced signal Y received from the edge emphasizing circuit 137 and the reproduced signal C recorded form the quadrature two-phase modulation circuit 141 and produces a composite video signal of the NTSC system. The composite video signal is supplied via the video output terminal Vout to the external monitor device.

While a considerable effect is expectable from applying the edge emphasizing process solely to the luminance signal component, the arrangement to apply the edge emphasizing process also to the chrominance signal component gives a reproduced picture in more natural colors. Particularly, with the edge emphasizing process arranged to be applied to the chrominance signal C in its stage of color difference signals as in the case of the ninth embodiment shown in FIG. 12, the reproduced image or picture presents extremely natural colors.

Further, in carrying out the operation wherein the video signal obtained either by an image sensing process or by a reproducing process is separated into a luminance signal component and a chrominance signal component and then they are reunited through some signal processing actions, the phase relation between these signal components must be kept unvarying despite the occurrence of the operation. For this purpose, phase adjusting circuit elements are of course arranged in suitable positions within the circuit arrangement although they are not shown in the drawing.

In each of the eighth and ninth embodiments, the edge emphasizing circuit is arranged to perform either a horizontal edge emphasizing function or a vertical edge emphasizing function or both of these functions. However, the method for the edge emphasizing process does not essentially relates to this invention.

As mentioned in the foregoing, in each of the eight and ninth embodiments of this invention, the edge emphasizing circuit of the camera-combined type VTR is arranged to be usable both for recording and reproduction. This permits reduction in size, weight and cost of the VTR. In the case of the ninth embodiment in particular, the quality of the reproduced picture can be enhanced as the edge emphasizing process is applied not only to the luminance signal component but also to the chrominance signal component of the video signal.

Figure 13:
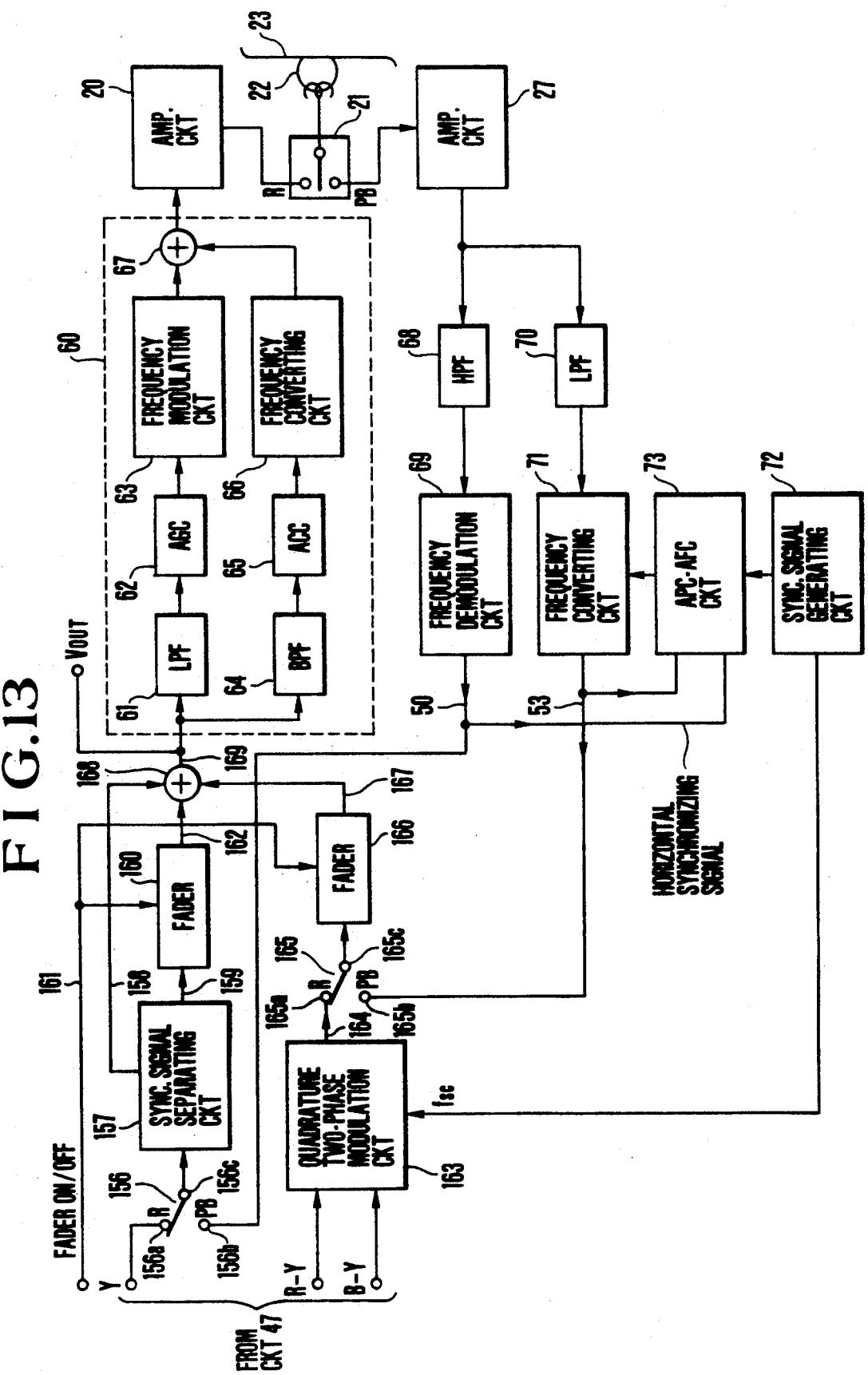
FIG. 13 is a block diagram showing in outline a camera-combined type VTR having a fader circuit arranged according to this invention as a tenth embodiment thereof.

FIG. 13 shows a tenth embodiment of this invention. In this case, a luminance signal Y produced from the video signal conversion circuit 47 of a camera part which is arranged as described in the foregoing with reference to FIG. 6 is arranged to be supplied to a first terminal 156a of a change-over switch 156. The common plate 156c of the switch 156 is connected to the input terminal of a synchronizing signal separating circuit 157 which separates a synchronizing signal from the signal Y. The circuit 157 is arranged to produce the separated synchronizing signal onto a line 158 and also to produce the signal Y (or the signal Y after separation of the synchronizing signal) onto a line 159. The signal on the line 159 comes to a fader 160. The fader 160 is arranged to perform a fader process on the signal coming via the line 159 under the control of a fader control signal (an NO/OFF signal) coming via a line 161. The output of the fader is produced onto a line 162.

Two color difference signals R-Y and B-Y coming from the video signal conversion circuit 47 are supplied to a quadrature two-phase modulation circuit 163. This circuit 163 also receives a sub-carrier fsc of 3.58 MHz and is arranged to quadrature two-phase modulate the sub-carrier with the two color difference signals R-Y and B-Y to form thereby a carrier chrominance signal, which is then produced onto a line 164. The line 164 is connected to the first terminal 165a of a switch 165. The common plate 165c of the switch 165 is connected to the input terminal of a second fader 166. The fader 166 is arranged, like the other fader 160, to perform a fader process on the incoming signal according to the fader control signal coming via the control line 161 and the signal thus processed is produced onto a line 167. These faders 160 and 166 are normally provided within the camera part for carrying out the fader process during an image sensing operation.

The lines 158, 162 and 167 are connected to the input terminals of a multiplexing circuit 168. The multiplexing circuit 168 is arranged to multiplex the synchronizing signal on the line 158, the luminance signal Y on the line 162 and the carrier chrominance signal on the line 167 together. A composite video signal of the NTSC system is thus obtained and produced onto an output line 169. The line 169 is connected to a video output terminal Vout for an external monitor and is also connected to the input terminal of a VTR recording circuit system 60.

The VTR recording circuit system 60 is arranged in a generally practiced known manner to record a television signal of the NTSC color system by frequency modulating the luminance signal; by low-band converting the chrominance signal; and by multiplexing them for recording. The arrangement of the recording circuit system 60 is identical with the system which is described in the foregoing with reference to FIG. 5 and, therefore, the detailed description of it is omitted here.

Further, in FIG. 13, circuit elements 68 to 73 form a VTR reproduction circuit system corresponding to the VTR recording circuit system 60. The reproduction circuit system is also arranged in a generally practiced manner to reproduce an NTSC television signal by the known method of frequency modulating the luminance signal; by low-band converting the chrominance signal; and by multiplexing these signals. The reproduction circuit system of the tenth embodiment is also arranged in the same manner as in the case of FIG. 5. Therefore, the detailed description of it is also omitted here.

Referring further to FIG. 13, a line 50 is connected to the second terminal 156b of the switch 156. A line 53 is connected to the second terminal 165b of the switch 165. The tenth embodiment shown in FIG. 13 operates as described below:

In an image sensing recording mode: The common plates 156c and 165c of the switches 156 and 165 are connected to their first terminals 156a and 165a and the position of the switch 21 shifts to its connecting side R in accordance with the instruction of a system controller which is not shown. In this mode, a video signal representing the picked up image of an object is produced from the video signal conversion circuit 47 of the camera part of the VTR. The luminance signal Y of the video signal is supplied to the synchronizing signal separating circuit 157 to have a synchronizing signal separated therefrom. The signal Y is then undergoes a fader process which is performed by the fader 160 in accordance with a fader control signal. Meanwhile, color difference signals R-Y and B-Y from the video signal conversion circuit 47 are supplied to the quadrature two-phase modulation circuit 163. The circuit 163 quadrature two-phase modulates the sub-carrier fsc which is received from the synchronizing signal generating circuit 72 into a carrier chrominance signal C with the color difference signals R-Y and B-Y. The carrier chrominance signal C is then produced from the circuit 163 onto the line 164. The signal C on the line 164 is supplied via the switch 165 to the fader 166. The fader 166 also performs, like the other fader 160, a fader process as necessary on the signal C in accordance with the fader control signal. The signal is then supplied to the multiplexing circuit 168.

The multiplexing circuit 168 multiplexes the synchronizing signal which is separated at the separating circuit 157, the signal Y component from the fader 160 and the signal C component from the fader 166 to form a composite video signal and produces it onto the line 169. This composite video signal is supplied to the VTR recording circuit system 60. The circuit system 60 then performs the frequency modulation and the low-band conversion in the same manner as in the case of FIG. 5. The signal thus processed is magnetically recorded on a magnetic tape 23 by a magnetic head 22. Further, the composite video signal on the line 169 is also supplied to an external monitor via the output terminal Vout.

In a reproduction mode: The common plates 156c and 165c of the switches 156 and 165 are connected to their second terminals 156b and 165b and the position of the switch 21 shifts to the other connecting side PB thereof respectively in accordance with the instruction of the system controller. When a video signal record is reproduced from the magnetic tape 23 under this condition, a luminance signal Y and a carrier chrominance signal C are obtained from the reproduced signal. The signals Y and C are respectively put onto the lines 50 and 53.

The reproduced luminance signal Y on the line 50 is supplied via the switch 156 to the synchronizing signal separating circuit 157. Then, like in the case of the signal Y obtained from the video signal conversion circuit 47 in the recording mode, the reproduced signal Y undergoes a fader process at the fader 160. The reproduced signal C on the line 53 is supplied via the switch 165 to the other fader 166 to be likewise fader processed by the fader 166. The outputs of the two faders 160 and 166 and the synchronizing signal of the reproduced signal Y are multiplexed by the multiplexing circuit 168. The output of the circuit 168 is then supplied via the video output terminal Vout to an external monitor.

The tenth embodiment shown in FIG. 13 is arranged to apply the fader process to both the reproduced luminance signal and the reproduced chrominance signal. This arrangement, however, may be changed to apply the fader process only to the reproduced luminance signal. In the case of such modification, the switch 165 and the fader 166 are omitted and the line 164 is connected to the multiplexing circuit 168.

Figure 14:
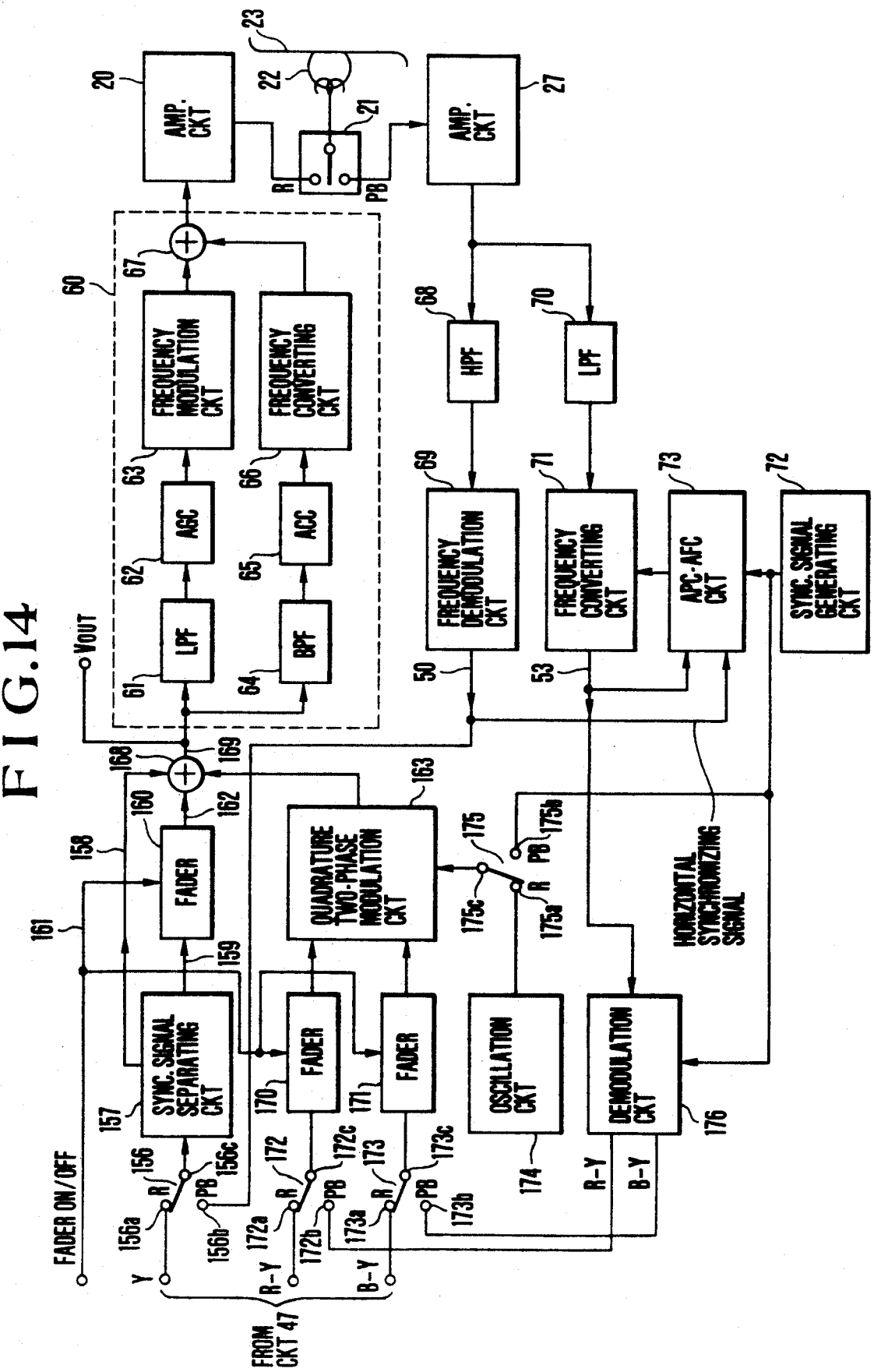
FIG. 14 is a block diagram showing in outline the arrangement of a camera-combined type VTR having another fader circuit arranged according to this invention as an eleventh embodiment thereof.

FIG. 14 shows an eleventh embodiment of this invention. In this case, the invention is applied to a camera-combined type VTR which is arranged to apply the fader process to the reproduced chrominance signal while it is in the form of color difference signals by temporarily demodulating it into the color difference signals. FIG. 14 thus shows an embodiment different from the tenth embodiment shown in FIG. 13. In FIG. 14, however, the same components and parts as those of FIG. 13 are indicated by the same reference numerals and symbols.

Since the fader process is to be applied in the stage of the color difference signals, faders 170 and 171 are disposed in front of the quadrature two-phase modulation circuit. The input terminal of the fader 170 is connected to the common plate 172c of a change-over switch 172 which is similar to the change-over switch 156. The first terminal 172a of the switch 172 is connected to a line supplying a color difference signal R-Y from the video signal conversion circuit 47. The input terminal of the other fader 171 is connected to the common plate 73 of a change-over switch 173. The first terminal 173a of the switch 173 is connected to a line supplying a color difference signal B-Y from the video signal conversion circuit 47. The faders 170 and 171 are arranged to operate under the control of a fader control signal which comes via a line 161.

The output terminal of a quadrature two-phase modulation circuit 163 is connected directly to the input terminal of a multiplexing circuit 168. A change-over switch 175 is interposed in between the circuit 163 and an oscillation circuit 174. The switch 175 is arranged to enable the quadrature two-phase modulation circuit 163 to use a sub-carrier fsc (particularly information on the phase thereof) generated by a synchronizing signal generating circuit 72. More specifically, the common plate 175c of the switch 175 is connected to the sub-carrier input terminal of the circuit 163. The first terminal 175a of the switch 175 is connected to the oscillation circuit 174 and the second terminal 175b to the output terminal of a synchronizing signal generating circuit 72.

A carrier chrominance signal C which comes via a line 53 is processed by a demodulation circuit 176 back into two color difference signals R-Y and B-Y. A line supplying the signal R-Y from the demodulation circuit 176 is connected to the second terminal 172b of the switch 172. A line supplying the signal B-Y is connected to the second terminal 173b of the switch 173.

In a image sensing recording mode, the eleventh embodiment shown in FIG. 14 operates as follows: The common plates 156c, 172c, 173c and 175c of the switches 156, 172, 173 and 175 are connected respectively to their first terminals 156a, 172a, 173a and 175a in accordance with the instruction of a system control which is not shown. The position of the switch 21 is shifted to one connecting side R thereof. Therefore, the chrominance signal component of the picked up image video signal is fader processed in its stage of color difference signals. Then, a VTR recording circuit system 60 which is arranged in the same manner as in the case of the tenth embodiment records the video signal on a magnetic tape 23.

In a reproduction mode: The switches 156, 172, 173 and 175 respectively connect their common plates 156c, 172c, 173c and 175c to their second terminals 156b, 172b, 173b and 175b in accordance with the instruction of the system controller. Meanwhile, the position of the switch 21 shifts to its connecting side PB. A reproduced luminance signal Y which comes from the reproducing circuit system of the VTR is supplied via a line 50 and the switch 156 to the synchronizing signal separating circuit 157. A reproduced carrier chrominance signal produced onto a line 53 is processed back into color difference signals at the demodulation circuit 176. The color difference signals are respectively supplied to the faders 170 and 171 via the switches 172 and 173. The quadrature two-phase modulation circuit 163 modulates the sub-carrier fsc coming from the synchronizing signal generating circuit 72 with the reproduced color difference signals obtained via the faders 170 and 171. The output of the circuit 163 (chrominance signal) is then supplied to the multiplexing circuit 168. The circuit 168 multiplexes the fader processed reproduced luminance signal and the fader processed reproduced chrominance signal to form a composite video signal of the NTSC system. The composite video signal is supplied to the external monitor from the video output terminal Vout.

While a considerable effect is expectable from applying the fader process only to the luminance signal component of the reproduced video signal, the quality of the reproduced picture can be further improved by applying it also to the chrominance signal component. Especially, with the fader process applied to the chrominance signal in its stage of color difference signals as in the case of the eleventh embodiment, the reproduced picture comes to excel in color balance. The fader process is expected to become more important in the future for color balance as an increased fineness of a TV picture will be more strongly pursued. Therefore, the arrangement of the embodiment to process the color components of the picture in a balanced state is highly advantageous.

With each of the image sensing video signal and the reproduced video signal temporarily separated into a luminance signal and a chrominance signal, in recombining them after completion of a given signal processing operation, the phase relation between the luminance signal and the chrominance signal must be kept unchanged. To meet this requirement, delay circuits for phase adjustment are of course arranged in suitable positions although they are not shown in the drawing.

The camera-combined type VTR to which this invention is applied in the manner as described above as the tenth or eleventh embodiment thereof is capable of attaining a fader effect not only on the image sensing video signal but also on a reproduced video signal by switching the signal supply to the fader from the image sensing video signal over to the reproduced video signal. This arrangement obviates the necessity of providing an additional fade solely for the reproducing circuit system of the VTR part and thus permits reduction in size, weight and cost of the apparatus.

In each of the embodiments described, this invention is applied to a camera-combined type VTR. The invention is, however, not only applicable to such VTRs but also likewise advantageously applicable to a camera-combined still video apparatus, etc.

While the camera-combined type VTRs described as the embodiments of this invention are adapted for the television signal of the NTSC system, this invention is also applicable to other camera-combined type VTR adapted for the television signals of, for example, the known PAL and SECAM systems, etc. Further, in accordance with this invention, the recording method of the VTR part is not limited to the method of frequency modulating the luminance signal, low-band converting the carrier chrominance signal and multiplexing these signals which is employed in each of the embodiments described.

What is claimed:

1. A video signal generating apparatus including an image sensing part for picking up an image of an object and for generating a video signal corresponding to the object and a reproducing part for reproducing a video signal recorded on a recording medium, said image sensing part and said reproducing part being formed as an integral part, comprising:
   a) image sensing means arranged to pick up an image of an object and to generate a first video signal corresponding to said object;
   b) reproducing means for reproducing a second video signal from the recording medium having the second video signal recorded thereon;
   c) video signal adding means arranged to receive a video signal and to add a third video signal to the received video signal; and
   d) video signal supplying means for selectively supplying said first video signal outputted from said image sensing means or the second video signal outputted from said reproducing means to said video signal adding means.

2. An apparatus according to claim 1, wherein said video signal generating apparatus further comprises recording means for recording the first video signal, to which the third video signal has been added by said video signal adding means, on the recording medium.

3. An apparatus according to claim 1, wherein said video signal supplying means is arranged to supply the first video signal to said video signal adding means while said recording means is in operation and to supply the second video signal to said video signal adding means while said reproducing means is in operation.

4. An apparatus according to claim 1, wherein said video signal supplying means is arranged to supply said first video signal to said video signal adding means while said first video signal is being generated by said image sensing means and to supply the second video signal to said video signal adding means while said second video signal is being reproduced by said reproducing means.

5. An apparatus according to claim 1, wherein said video signal adding means includes:
   a) a video signal generating circuit which is arranged to generate said third video signal; and
   b) a multiplexing circuit which is arranged to receive the video signal and to multiplex said third video signal generated by said video signal generating circuit with the received video signal.

6. A video signal generating apparatus including an image sensing part for picking up an image of an object and for generating a video signal corresponding to the object and a reproducing part for reproducing a video signal recorded on a recording medium, said image sensing part and said reproducing part being formed as an integral part, comprising:
   a) image sensing means arranged to pick up an image of an object and to generate a first video signal corresponding to said object;
   b) reproducing means for reproducing a second video signal from a recording medium having the second video signal recorded thereon;
   c) fading means for receiving a video signal and fading the video signal thus received; and
   d) video signal supply means for selectively supplying said first video signal outputted from said image pick-up means or said second video signal outputted from said reproducing means to said fading means.

7. An apparatus according to claim 6, further comprising recording means for recording said first video signal on a recording medium after said first video signal is faded by said fading means.

8. An apparatus according to claim 7, wherein said video signal supply means is arranged to supply said fading means with said first video signal while said recording means is in operation and with said second video signal while said reproducing means is in operation.

9. An apparatus according to claim 6, wherein said video signal supply means is arranged to supply said fading means with said first video signal while said first video signal is being generated by said image sensing means and with said second video signal while said second video signal is being reproduced by said reproducing means.

10. An apparatus according to claim 6, wherein said first video signal includes a first luminance signal and a first carrier chrominance signal; said second video signal includes a second luminance signal and a second carrier chrominance signal; and said fading means includes two fading circuits which are arranged to fade the luminance signal and the carrier chrominance signal respectively and to ouput the faded signals.

11. An apparatus according to claim 6, wherein said first video signal includes a first luminance signal and a first color difference signal; said second video signal includes a second luminance signal and a second color difference signal; and said fading means includes a plurality of fading circuits which are arranged to fade the luminance signal and the color difference signal respectively and to output the faded signals.

12. A color video signal generating apparatus including an image sensing part for picking up an image of an object and for generating a color video signal corresponding to the object and a reproducing part for reproducing a color video signal recorded on a recording medium, said image sensing part and said reproducing part being formed as an integral part, comprising:
   (a) image sensing means arranged to pick up an image of an object and to generate a first color video signal corresponding to said object;
   (b) reproducing means for reproducing a second color video signal from the recording medium having the color video signal recorded thereon; and
   (c) color video signal adding means arranged to add a third color video signal to either one of the first color video signal outputted from said image sensing means or the second color video signal outputted from said reproducing means.

13. An apparatus according to claim 12, further comprising:
   recording means for recording the first color video signal to which the third color video signal has been added by said color video signal adding means, on the recording medium.

14. An apparatus according to claim 13, wherein said color video signal adding means is arranged to add the third color video signal to the first color video signal while said recording means is in operation and to add the third color video signal to the second color video signal while said reproducing means is in operation.

15. An apparatus according to claim 12, wherein said color video signal adding means is arranged to add the third color video signal to said first color video signal while the color video signal is being generated from said image sensing means and to add the third color video signal to said second color video signal while the second color video signal is being reproduced by said reproducing means.

16. An apparatus according to claim 12, further comprising:
   output means for outputting the second color video signal to which the third color video signal has been added by said color video signal adding means, to the outside.

17. An apparatus according to claim 12, wherein said first color video signal includes a first luminance signal and a first color information signal, said second color information signal includes a second luminance signal and a second color information signal, and said third color video signal includes a third luminance signal and a third color information signal.

18. An apparatus according to claim 17, wherein said color video signal adding means includes:
   (a) color video signal generating means for generating the third color video signal;
   (b) first multiplexing means for multiplexing the third luminance signal of the third color video signal generated by said color video signal generating means with the first luminance signal of said first color video signal or the second luminance signal of the second color video signal; and
   (c) second multiplexing means for multiplexing the third color information signal of the third color video signal generated by said color video signal generating means with the first color information signal of said first color video signal or the second color information signal of the second color video signal.

19. An apparatus according to claim 17, wherein said color information signal includes a chroma signal.

* * * * *

UNITED STATES PATENT AND TRADEMARK OFFICE
CERTIFICATE OF CORRECTION

PATENT NO.  :  5,159,462                    Page 1 of 3
DATED       :  October 27, 1992
INVENTOR(S) :  Hiroto Yasumura, et al.

It is certified that error appears in the above-identified patent and that said Letters Patent is hereby corrected as shown below:

On drawing sheet,
    FIG. 9.   Change "DIFFERRENCE" to -- DIFFERENCE --
    Col. 7, line 62.   Change "images" to -- image --
    Col. 8, line 24.   Change "for" to -- forms -- (first occurrence) and change "for" to -- color -- (second occurrence)
    Col. 9, line 14.   Change "is" to -- V1 --
    Col. 11, line 20.   After "and" insert -- 37 --
    Col. 11, lines 40 and 41.   Change "according" to -- accordingly --
    Col. 11, line 55.   Change "mention" to -- mentioned --
    Col. 13, line 10.   Change "modulate" to -- modulated --
    Col. 13, line 52.   Change "perform" to -- performs --
    Col. 16, line 23.   Delete "the" (first occurrence)
    Col. 16, line 59.   Change "A" to -- The --
    Col. 17, line 20.   Change "54a" to -- 54b --
    Col. 17, line 56.   Change "vilter" to -- filter --
    Col. 18, line 65.   After "signal" insert -- Y --
    Col. 19, line 39.   Change "t" to -- to --
    Col. 21, line 63.   Change "compensation" to -- compensating --
    Col. 22, line 27.   Change "are" to -- is --
    Col. 22, line 53.   Change "modulates" to -- modulate --
    Col. 25, line 19.   Change "an" to -- the --
    Col. 25, line 48.   Change "reproduced" to -- is produced --
    Col. 26, line 8.   Change "pulse for" to -- pulses or --

UNITED STATES PATENT AND TRADEMARK OFFICE
CERTIFICATE OF CORRECTION

PATENT NO. : 5,159,462  Page 2 of 3
DATED : October 27, 1992
INVENTOR(S) : Hiroto Yasumura, et al.

It is certified that error appears in the above-identified patent and that said Letters Patent is hereby corrected as shown below:

Col. 26, line 46.  Change "record" to -- records --
Col. 26, line 51.  Change "V out" to -- Vout --
Col. 27, line 12.  Change "synchronising" to -- synchronizing --
Col. 29, line 31.  Change "s" to -- a --
Col. 29, line 35.  After "color" insert -- burst --
Col. 29, line 63.  Change "modulate" to -- modulates --
Col. 32, line 49.  Change "multiplex" to -- multiplexes --
Col. 32, line 51.  Change "form" to -- from --
Col. 33, line 15.  Change "relates" to -- relate --
Col. 33, line 16.  Change "eight" to -- eighth --
Col. 34, line 41.  Delete "is"
Col. 35, line 54.  Change "73" to -- 173 --
Col. 36, line 14.  Change "a" to -- an --

UNITED STATES PATENT AND TRADEMARK OFFICE
CERTIFICATE OF CORRECTION

PATENT NO. : 5,159,462
DATED : October 27, 1992
INVENTOR(S) : Hiroto Yasumura, et al.

It is certified that error appears in the above-indentified patent and that said Letters Patent is hereby corrected as shown below:

Col. 36, line 19, change "control" to —controller—

Signed and Sealed this

Tenth Day of January, 1995

Attest:

BRUCE LEHMAN

Attesting Officer

Commissioner of Patents and Trademarks